US012357442B2

(12) United States Patent
Blum et al.

(10) Patent No.: US 12,357,442 B2
(45) Date of Patent: *Jul. 15, 2025

(54) MATERIAL DELIVERY SYSTEMS, BEAK OPENING APPARATUS AND METHODS OF USE

(71) Applicant: NOVA-TECH ENGINEERING, LLC, Willmar, MN (US)

(72) Inventors: Nathan A. Blum, Cosmos, MN (US); Jeff Deming, New London, MN (US); Matthew H. Erickson, Spicer, MN (US); Scott C. Johnson, Blomkest, MN (US); James Kleven, Willmar, MN (US); Greg R. Swenson, US, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,540

(22) Filed: Mar. 7, 2024

(65) Prior Publication Data

US 2024/0207029 A1 Jun. 27, 2024

Related U.S. Application Data

(63) Continuation of application No. 16/964,700, filed as application No. PCT/US2019/014905 on Jan. 24, 2019, now Pat. No. 11,937,997.

(Continued)

(51) Int. Cl.
*A61F 15/00* (2006.01)
*A01K 45/00* (2006.01)
(Continued)

(52) U.S. Cl.
CPC .............. *A61D 15/00* (2013.01); *A01K 45/00* (2013.01); *A61D 3/00* (2013.01); *A61D 7/00* (2013.01);
(Continued)

(58) Field of Classification Search
CPC ............ A61D 15/00; A61D 3/00; A61D 7/00; A61D 2003/003; A01K 45/00; A01K 39/012
(Continued)

(56) References Cited

U.S. PATENT DOCUMENTS 3,302,645 A * 2/1967 Lockmiller ............ A61D 1/025
                                                        606/163
3,964,481 A     6/1976  Gourlandt
4,026,289 A     5/1977  Hendrix
5,651,731 A     7/1997  Gorans et al.
(Continued)

FOREIGN PATENT DOCUMENTS

CN      203801603 U     9/2014
FR      2 780 856 A1    1/2000
FR      2 833 807 A1    6/2003

OTHER PUBLICATIONS

International Patent Application No. PCT/US2019/014905 filed Jan. 24, 2019, International Preliminary Report on Patentability issued May 27, 2020, 32 pages. International Patent Application No. PCT/US2019/014905 filed Jan. 24, 2019, Second Written Opinion issued Mar. 6, 2020, 13 pages.
(Continued)

*Primary Examiner* — Jessica Weiss
(74) *Attorney, Agent, or Firm* — Mueting Raasch Group

(57) ABSTRACT

Beak opening apparatus and methods of using the same are described herein. The beak opening apparatus includes a beak splitter and beak opening actuator along with a control unit used to operate the beak opening actuator to move the beak splitter between a home position and an opening position to open the beak of a bird.

29 Claims, 19 Drawing Sheets

Related U.S. Application Data

(60) Provisional application No. 62/621,938, filed on Jan. 25, 2018.

(51) Int. Cl.
    *A61D 3/00*      (2006.01)
    *A61D 7/00*      (2006.01)
    *A61D 15/00*      (2006.01)
    *A01K 39/012*      (2006.01)

(52) U.S. Cl.
    CPC ...... *A01K 39/012* (2013.01); *A61D 2003/003* (2013.01)

(58) Field of Classification Search
    USPC .................................. 600/243, 237; 604/514
    See application file for complete search history.

(56) References Cited

U.S. PATENT DOCUMENTS

| | | |
|---|---|---|
| 5,722,936 A | 3/1998 | Trulio |
| 7,232,450 B2 | 6/2007 | Gorans et al. |
| 7,363,881 B2 | 4/2008 | Gorans et al. |
| 7,367,284 B2 | 5/2008 | Gorans |
| 2012/0012070 A1 | 1/2012 | Gorans et al. |

OTHER PUBLICATIONS

International Patent Application No. PCT/US2019/014905, filed Jan. 24, 2019, International Search Report and Written Opinion issued Sep. 25, 2019, 12 pages.

Office Action issued in Korea for Application No. 10-2020-7022959 dated Jan. 24, 2025 (4 pages). English translation included.

* cited by examiner

MATERIAL DELIVERY SYSTEMS, BEAK OPENING APPARATUS AND METHODS OF USE

RELATED APPLICATION

This application is a continuation application of U.S. application Ser. No. 16/964,700, filed 24 Jul. 2020, and which is a § 371 U.S. National Stage of International Application No. PCT/US2019/014905, filed 24 Jan. 2019, which claims the benefit under 35 U.S.C. § 119 of U.S. Provisional Application Ser. No. 62/621,938, filed 25 Jan. 2018, and titled MATERIAL DELIVERY SYSTEMS, BEAK OPENING APPARATUS AND METHODS OF USE, the disclosures of which are incorporated herein by reference in their entireties.

Systems for delivering material through an open beak to a digestive tract of a bird and methods of using the same are described herein. Beak opening apparatus and methods of using the same are also described herein.

The processing of poultry may include activities such as sexing to determine gender, vaccinating or otherwise medicating the birds, feeding the birds, weighing the birds, treating the beaks and/or claws of the birds (to, for example, retard their growth), etc. In some conventional systems, birds are handled manually, that is, individuals must physically hold the bird and open the beak of the bird to, for example, deliver materials to the digestive tract of a bird and/or provide treatments to the upper and/or lower mandibles of the beak. Such manual processes may limit the ability of producers to cost-effectively deliver materials to the digestive tract of birds and, may, result in unwanted or undesirable variations in accuracy of the delivery process, injury to the birds, etc. Such manual processes may also limit the ability of producers to cost-effectively and accurately provide selective treatments to the upper and/or lower mandibles of bird beaks.

Materials that may be delivered to the digestive tract of a bird may include one or more constituents such as, for example, medicaments, vitamins, minerals, probiotics, nutrition, etc.

SUMMARY

Systems for delivering material through an open beak to a digestive tract of a bird and methods of using the same are described herein. Beak opening apparatus and methods of using the same are also described herein.

One potential advantage of one or more embodiments of the systems, apparatus, and methods described herein is the ability to open the beaks of birds in a manner that is effective, cost-efficient, and reduces the likelihood of injury to the birds.

Another potential advantage of one or more embodiments of the systems, apparatus, and methods described herein is the ability to accurately deliver material to the digestive tract of a bird in a manner that is effective, cost-efficient, and reduces the likelihood of injury to the birds.

The materials delivered to birds using the systems, apparatus and methods described herein may be in one or more of a variety of forms. Examples of some forms in which the materials may be delivered include, but are not limited to, liquids, gels, powders, granular form, pills, capsules, and combinations thereof.

Delivery to the digestive tract of a bird as described herein may include delivery of the materials to the mouth, oral cavity, esophagus, and/or crop of the bird. In one or more embodiments, delivery to the digestive tract may involve delivery to a location in the esophagus just proximal of the crop and/or in the crop of the bird, where "just proximal of the crop" means at a location in the esophagus that is closer to the crop than the oral cavity of the bird.

Although the systems and methods described herein may be used with birds of any age, they may be particularly useful when used with hatchlings, where "hatchlings" are defined as young birds (for example, chickens, turkeys, ducks, geese, etc.) with an age of one week or less.

Also, although the beak opening apparatus and material delivery systems described herein are described as opening the beak of a bird, we understood that the term "beak" is used to generically describe beaks, bills, mouth, etc. of birds.

In a first aspect, one or more embodiments of a system for delivering material through an open beak to a digestive tract of a bird positioned in a delivery location relative to the system may include: an optional a beak opening apparatus configured to open the beak of the bird positioned in the delivery location, the beak opening apparatus comprising: a beak splitter movable between a home position and an opening position, wherein the beak splitter is configured to separate an upper mandible of the bird positioned from a lower mandible of the bird to open the beak of the bird positioned in the delivery location when the beak splitter moves from the home position to the opening position; a beak opening actuator operably connected to the beak splitter, wherein the beak opening actuator is configured to move the beak splitter between the opening position and the home position. The system may further include a material delivery apparatus configured to deliver material into the digestive tract of the bird positioned in the delivery location, wherein the material delivery apparatus comprises: a delivery tube extending between a delivery end and a supply end; a delivery tube driver configured to move the delivery tube between a retracted position and a delivery position, wherein the delivery end of the delivery tube is located in the digestive tract of the bird when the bird is positioned in the delivery location and beak of the bird is open; and a material delivery device connected to the supply end of the delivery tube and a supply configured to contain material for delivery to the bird positioned in the delivery location, wherein the material delivery device is configured to deliver the material from the supply into the delivery tube through the supply end of the delivery tube. The system may further include a control unit operably connected to the beak opening actuator and the delivery tube driver, wherein the control unit is configured to: operate the beak opening actuator to move the beak splitter between the home position and the opening position; and operate the delivery tube driver to move the delivery tube between the retracted position and the delivery position.

In one or more embodiments of the systems for delivering material through an open beak to a digestive tract of a bird as described herein, the delivery end of the delivery tube comprises an enlarged tip, wherein the enlarged tip comprises a maximum tip dimension measured transverse to a delivery tube axis that extends from the supply end to the delivery end of the delivery tube, wherein the delivery tube comprises a maximum tube dimension measured transverse to the delivery tube axis at a junction between the delivery tube and the enlarged tip proximal of the enlarged tip, and wherein the maximum tip dimension is larger than the maximum tube dimension. In one or more embodiments, the enlarged tip comprises a rounded leading surface. In one or more embodiments, the delivery tube comprises a lumen extending from the supply end to the delivery end, and wherein the lumen extends through the enlarged tip.

In one or more embodiments of the systems for delivering material through an open beak to a digestive tract of a bird as described herein, the delivery end of the delivery tube is offset from a midline of the bird positioned in the delivery location as the delivery tube moves from the retracted position towards the extended position.

In one or more embodiments of the systems for delivering material through an open beak to a digestive tract of a bird as described herein, the delivery tube comprises: a delivery end section extending from the delivery end towards the supply end, wherein the delivery end section comprises a length of 15 centimeters or less, 10 centimeters or less, or 5 centimeters or less; and a supply end section extending from the supply end towards the delivery end, wherein the supply end section comprises a length of 15 centimeters or less, 10 centimeters or less, or 5 centimeters or less; wherein the delivery end section comprises a maximum bending resistance that is lower than a maximum bending resistance of the supply end section.

In one or more embodiments of the systems for delivering material through an open beak to a digestive tract of a bird as described herein, the delivery tube comprises a delivery end section extending from the delivery end towards the supply end; and a supply end section extending from the supply end towards the delivery end section; wherein a bending resistance of the delivery end section of the delivery tube is less than a bending resistance of the delivery tube within the supply end section.

In one or more embodiments of the systems for delivering material through an open beak to a digestive tract of a bird as described herein, the delivery tube comprises: a delivery end section extending from the delivery end towards the supply end; and a supply end section extending from the supply end towards the delivery end section; wherein the delivery end section comprises a delivery end section length measured from the delivery end to a distal end of the supply end section and wherein the supply end section comprises a supply end section length measured from the supply end to a proximal end of the delivery end section, wherein the delivery end section and the supply end section meet at the distal end of the supply end section and the proximal end of the supply end section, and wherein the delivery end section length is equal to or greater than the supply end section length.

In one or more embodiments of the systems for delivering material through an open beak to a digestive tract of a bird as described herein, the beak splitter is configured to direct the delivery end of the delivery tube into the digestive tract of the bird when the bird is positioned in the delivery location and beak of the bird is open. In one or more embodiments, the delivery end of the delivery tube is closer to the beak splitter when the delivery tube is in the retracted position than when the delivery tube is in the delivery position. In one or more embodiments, the beak splitter comprises a delivery tube passageway formed therethrough, wherein the delivery tube moves within the delivery tube passageway when the delivery tube moves between the retracted position and the delivery position.

In one or more embodiments of the systems for delivering material through an open beak to a digestive tract of a bird as described herein, the delivery tube driver is configured to move the delivery tube such that, when the delivery tube is in the delivery position and the bird is positioned in the delivery location, the delivery end of the delivery tube is located in the esophagus of the bird, in the esophagus of the bird just proximal of the crop, and/or in the crop of the bird.

In one or more embodiments of the systems for delivering material through an open beak to a digestive tract of a bird as described herein, the beak opening apparatus further comprises a sensor apparatus operably connected to the control unit and configured to detect when the beak of the bird positioned in the delivery location is open, wherein the sensor apparatus comprises one or more of: an optical source and an optical sensor, a proximity detector, an ultrasonic detector, and a mechanical switch.

In one or more embodiments of the systems for delivering material through an open beak to a digestive tract of a bird as described herein, the beak opening apparatus comprises a sensor apparatus operably connected to the control unit and configured to detect when the beak of the bird positioned in the delivery location is open, wherein the sensor apparatus comprises an optical source and a pair of optical sensors; wherein a first optical sensor of the pair of optical sensors is positioned such that the lower mandible of the beak of the bird blocks light emitted by the optical source from reaching the first optical sensor when the beak of the bird positioned in the delivery location is open; and wherein a second optical sensor of the pair of optical sensors is positioned such that the upper mandible of the beak of the bird blocks light emitted by the optical source from reaching the second optical sensor when the beak of the bird positioned in the delivery location is open.

In one or more embodiments of the systems for delivering material through an open beak to a digestive tract of a bird as described herein, the beak opening apparatus further comprises a beak tip detector operably connected to the control unit, wherein the control unit is configured to: receive a signal from the beak tip detector when the beak tip detector detects the tip of the upper mandible of the beak of the bird positioned in the delivery location; and operate the beak opening actuator to move the beak splitter between the home position and the opening position after receiving the signal from the beak tip detector. In one or more embodiments, the beak tip detector comprises one or more of: an optical source and optical detector, a proximity detector, an ultrasonic detector, and a mechanical detector.

In one or more embodiments of the systems for delivering material through an open beak to a digestive tract of a bird as described herein, the beak splitter is shaped to contact the upper mandible of the beak of the bird positioned in the delivery location before the beak splitter contacts the lower mandible when the beak splitter is moving from the home position to the opening position. In one or more embodiments, the beak splitter comprises a contact surface positioned to contact the upper mandible of the beak of the bird positioned in the delivery location before the beak splitter contacts the lower mandible when the beak splitter is moving from the home position to the opening position.

In one or more embodiments of the systems for delivering material through an open beak to a digestive tract of a bird as described herein, the beak splitter moves along an arcuate path when moving between the home position and the opening position.

In one or more embodiments of the systems for delivering material through an open beak to a digestive tract of a bird as described herein, the beak splitter is located on a beak opening carriage and the beak opening actuator is operably connected to the beak opening carriage, wherein the beak opening carriage is movable between a carriage home position and a carriage opening position, wherein the beak splitter is in the home position when the beak opening carriage is in the carriage home position, and wherein the beak splitter is in the opening position when the beak opening carriage is in the carriage opening position.

In one or more embodiments of the systems for delivering material through an open beak to a digestive tract of a bird as described herein, the system comprises a carrier configured to restrain a bird in the delivery location.

In a second aspect, one or more embodiments of methods of delivering material to a digestive tract of a bird through an open beak of the bird as described herein may include: positioning a bird in a delivery location; opening the beak of the bird after positioning the bird in the delivery location by separating the upper mandible from the lower mandible; extending a delivery end of a delivery tube into the digestive tract of the bird through the open beak of the bird; passing material through the delivery tube and into the digestive tract of the bird while the delivery end of the delivery tube is in the digestive tract of the bird; removing the delivery tube from the digestive tract of the bird after passing material through the delivery tube into the digestive tract; and moving the bird out of the delivery location.

In one or more embodiments of the methods of delivering material to a digestive tract of a bird through an open beak of the bird as described herein, opening the beak of the bird comprises contacting the upper mandible of the beak before contacting the lower mandible of the beak.

In one or more embodiments of the methods of delivering material to a digestive tract of a bird through an open beak of the bird as described herein, opening the beak of the bird comprises moving a beak splitter from a home position to an opening position between the upper mandible and the lower mandible of the beak.

In one or more embodiments of the methods of delivering material to a digestive tract of a bird through an open beak of the bird as described herein, opening the beak of the bird comprises moving a beak splitter from a home position to an opening position between the upper mandible and the lower mandible of the beak, and wherein the beak splitter contacts the upper mandible of the beak of the bird positioned in the delivery location before the beak splitter contacts the lower mandible when the beak splitter is moving from the home position to the opening position.

In one or more embodiments of the methods of delivering material to a digestive tract of a bird through an open beak of the bird as described herein, the beak splitter moves along an arcuate path when moving between the home position and the opening position.

In one or more embodiments of the methods of delivering material to a digestive tract of a bird through an open beak of the bird as described herein, the method further comprises detecting the tip of the upper mandible of the beak of the bird positioned in the delivery location before opening the beak of the bird.

In one or more embodiments of the methods of delivering material to a digestive tract of a bird through an open beak of the bird as described herein, the beak splitter directs the delivery end of the delivery tube into the digestive tract of the bird when the bird is positioned in the delivery location and beak of the bird is open. In one or more embodiments, extending the delivery end of the delivery tube into the digestive tract of the bird comprises moving the delivery tube from a retracted position to a delivery position, and wherein the delivery end of the delivery tube is closer to the beak splitter when the delivery tube is in the retracted position than when the delivery tube is in the delivery position. In one or more embodiments, the delivery end of the delivery tube is offset from a midline of the bird positioned in the delivery location as the delivery tube moves from the retracted position towards the extended position. In one or more embodiments, the beak splitter comprises a delivery tube passageway formed therethrough, wherein the delivery tube moves within the delivery tube passageway when the delivery tube moves between the retracted position and the delivery position.

In one or more embodiments of the methods of delivering material to a digestive tract of a bird through an open beak of the bird as described herein, extending the delivery end of the delivery tube into the digestive tract of the bird comprises positioning the delivery end of the delivery tube in the esophagus of the bird, in the esophagus of the bird just proximal of the crop, and/or in the crop of the bird.

In one or more embodiments of the methods of delivering material to a digestive tract of a bird through an open beak of the bird as described herein, the delivery tube comprises: a delivery end section extending from the delivery end towards the supply end, wherein the delivery end section comprises a length of 15 centimeters or less, 10 centimeters or less, or 5 centimeters or less; and a supply end section extending from the supply end towards the delivery end, wherein the supply end section comprises a length of 15 centimeters or less, 10 centimeters or less, or 5 centimeters or less; wherein the delivery end section comprises a maximum bending resistance that is lower than a maximum bending resistance of the supply end section.

In one or more embodiments of the methods of delivering material to a digestive tract of a bird through an open beak of the bird as described herein, the delivery tube comprises: a delivery end section extending from the delivery end towards the supply end; and a supply end section extending from the supply end towards the delivery end section; wherein a bending resistance of the delivery end section of the delivery tube is less than a bending resistance of the delivery tube within the supply end section.

In one or more embodiments of the methods of delivering material to a digestive tract of a bird through an open beak of the bird as described herein, the delivery tube comprises: a delivery end section extending from the delivery end towards the supply end; and a supply end section extending from the supply end towards the delivery end section; wherein the delivery end section comprises a delivery end section length measured from the delivery end to a distal end of the supply end section and wherein the supply end section comprises a supply end section length measured from the supply end to a proximal end of the delivery end section, wherein the delivery end section and the supply end section meet at the distal end of the supply end section and the proximal end of the supply end section, and wherein the delivery end section length is equal to or greater than the supply end section length.

In one or more embodiments of the methods of delivering material to a digestive tract of a bird through an open beak of the bird as described herein, wherein the method further comprises restraining the bird in a carrier before positioning the bird in the delivery location, and moving the bird restrained in the carrier into the delivery location.

In a third aspect, one or more embodiments of a beak opening apparatus for opening a beak of a bird positioned in a delivery location relative to the beak opening apparatus may include: a beak splitter movable between a home position and an opening position, wherein the beak splitter is configured to separate an upper mandible of the bird in the delivery location from a lower mandible of the bird to open the beak of the bird in the delivery location when the beak splitter moves from the home position to the opening position; a beak opening actuator operably connected to the beak splitter, wherein the beak opening actuator is configured to move the beak splitter between the opening position and the home position; and a control unit operably connected to the beak opening actuator, wherein the control unit is configured to operate the beak opening actuator to move the beak splitter between the home position and the opening position.

In one or more embodiments of a beak opening apparatus for opening a beak of a bird as described herein, the beak opening apparatus further comprises a sensor apparatus operably connected to the control unit and configured to detect when the beak of the bird positioned in the delivery location is open, wherein the sensor apparatus comprises one or more of: an optical source and an optical sensor, a proximity detector, an ultrasonic detector, and a mechanical switch.

In one or more embodiments of a beak opening apparatus for opening a beak of a bird as described herein, the beak opening apparatus comprises a sensor apparatus operably connected to the control unit and configured to detect when the beak of the bird positioned in the delivery location is open, wherein the sensor apparatus comprises an optical source and a pair of optical sensors; wherein a first optical sensor of the pair of optical sensors is positioned such that the lower mandible of the beak of the bird blocks light emitted by the optical source from reaching the first optical sensor when the beak of the bird positioned in the delivery location is open; and wherein a second optical sensor of the pair of optical sensors is positioned such that the upper mandible of the beak of the bird blocks light emitted by the optical source from reaching the second optical sensor when the beak of the bird positioned in the delivery location is open.

In one or more embodiments of a beak opening apparatus for opening a beak of a bird as described herein, the beak opening apparatus further comprises a beak tip detector operably connected to the control unit, wherein the control unit is configured to: receive a signal from the beak tip detector when the beak tip detector detects the tip of the upper mandible of the beak of the bird in the delivery location; and operate the beak opening actuator to move the beak splitter between the home position and the opening position after receiving the signal from the beak tip detector. In one or more embodiments, the beak tip detector comprises one or more of: an optical source and optical detector, a proximity detector, an ultrasonic detector, and a mechanical detector.

In one or more embodiments of a beak opening apparatus for opening a beak of a bird as described herein, the beak splitter is shaped to contact the upper mandible of the beak of the bird in the delivery location before the beak splitter contacts the lower mandible when the beak splitter is moving from the home position to the opening position. In one or more embodiments, the beak splitter comprises a contact surface positioned to contact the upper mandible of the beak of the bird in the delivery location before the beak splitter contacts the lower mandible when the beak splitter is moving from the home position to the opening position.

In one or more embodiments of a beak opening apparatus for opening a beak of a bird as described herein, the beak splitter moves along an arcuate path when moving between the home position and the opening position.

In one or more embodiments of a beak opening apparatus for opening a beak of a bird as described herein, the beak splitter is located on a beak opening carriage and the beak opening actuator is operably connected to the beak opening carriage, wherein the beak opening carriage is movable between a carriage home position and a carriage opening position, wherein the beak splitter is in the home position when the beak opening carriage is in the carriage home position, and wherein the beak splitter is in the opening position when the beak opening carriage is in the carriage opening position.

In one or more embodiments of a beak opening apparatus for opening a beak of a bird as described herein, the beak opening apparatus comprises a carrier configured to restrain a bird in the delivery location.

In a fourth aspect, one or more embodiments of a method of opening a beak of a bird as described herein may include: positioning a bird in a delivery location; moving a beak splitter from a home position to an opening position after positioning the bird in the delivery location, wherein moving the beak splitter separates the upper mandible from the lower mandible to open the beak of the bird; and moving the bird out of the delivery location after opening the beak of the bird.

In one or more embodiments of the methods of opening a beak of a bird as described herein, moving the beak splitter from the home position to the opening position comprises contacting the upper mandible of the beak before contacting the lower mandible of the beak.

In one or more embodiments of the methods of opening a beak of a bird as described herein, the beak splitter moves along an arcuate path when moving between the home position and the opening position.

In one or more embodiments of the methods of opening a beak of a bird as described herein, the method further comprises detecting the tip of the upper mandible of the beak of the bird positioned in the delivery location before moving the beak splitter from the home position to the opening position.

In one or more embodiments of the methods of opening a beak of a bird as described herein, the method comprises returning the beak splitter from the opening position to the home position before moving the bird out of the delivery location.

In one or more embodiments of the methods of opening a beak of a bird as described herein, the method further comprises restraining the bird in a carrier before positioning the bird in the delivery location, and moving the bird restrained in the carrier into the delivery location.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other only and, depending on the orientation of the apparatus when used, may or may not accurately describe the relative positions of the recited features with respect to the ground.

The above summary is not intended to describe each embodiment or every implementation of the systems, apparatus, and methods of using the same as described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Illustrative embodiments of the invention will be further described with reference to the views of the drawing as briefly described below.

DESCRIPTION OF ILLUSTRATIVE EMBODIMENTS

Figure 1:
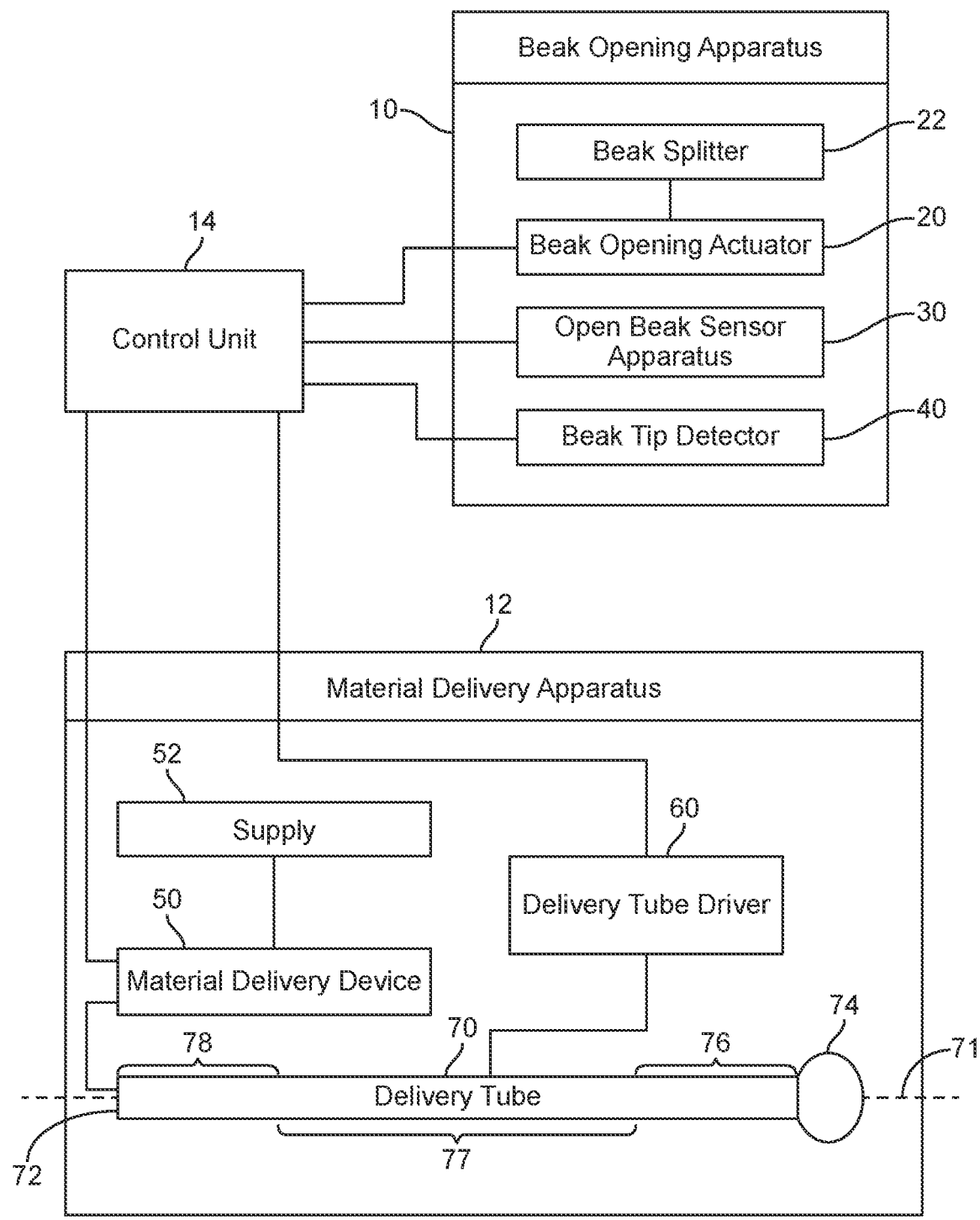
FIG. 1 is a schematic diagram of one illustrative embodiment of a system for delivering material through an open beak to a digestive tract of a bird as described herein.

In the following description of illustrative embodiments, reference is made to the accompanying figures of the drawing which form a part hereof, and in which are shown, by way of illustration, specific illustrative embodiments. It is to be understood that other embodiments may be utilized and structural changes may be made without departing from the scope of the present invention. Further, like reference numbers across the different figures designate the same features in the various figures of the drawing.

One illustrative embodiment of a system for delivering material through an open beak to a digestive tract of a bird is depicted schematically in FIG. 1. The depicted illustrative embodiment includes a beak opening apparatus 10, a material delivery apparatus 12, and a control unit 14 operably connected to various components in the beak opening apparatus 10 and the material delivery apparatus 12. The control units used in the systems and apparatus described herein may be provided in any suitable form and may, for example, include memory and a controller. In one or more embodiments, the controller of a control unit may, for example, be in the form of one or more microprocessors, Field-Programmable Gate Arrays (FPGA), Digital Signal Processors (DSP), microcontrollers, Application Specific Integrated Circuit (ASIC) state machines, etc.

In the depicted illustrative embodiment, beak opening apparatus 10 includes a beak opening actuator 20 operably connected to a beak splitter 22. Beak opening apparatus 10 also includes, in the depicted illustrative embodiment, an open beak sensor apparatus 30 and a beak tip detector 40.

In one or more embodiments of systems as described herein, a beak opening apparatus 10 may be configured to open the beak of the bird restrained in a carrier position in a delivery location relative to the system. In one or more embodiments, the beak splitter 22 is movable between a home position and an opening position. The beak splitter 22 is configured to separate an upper mandible of the bird restrained in the carrier from a lower mandible of the bird to open the beak of the bird restrained in the carrier in the delivery location when the beak splitter 22 moves from its home position to its opening position.

The beak opening actuator 20 is operably connected to the beak splitter 22 and configured to move the beak splitter 22 between its opening position and its home position. The beak opening actuator 20 may take a variety of forms capable of moving the beak splitter 22 between its opening position and its home position. In one or more embodiments, the beak opening actuator 20 may include one or more of electric motors, solenoids, hydraulic pistons, pneumatic pistons, biasing elements (for example, springs, etc.), gears, belts, pulleys, etc. In essence, combination of components capable of moving the beak splitter 22 between its opening position and its home position may be used as a beak opening actuator 20 in a material delivery system as described herein.

The illustrative embodiment of a system for delivering material as depicted in FIG. 1 also includes a material delivery apparatus 12 configured to deliver material into the digestive tract of the bird restrained in the carrier in the delivery location. In one or more embodiments, the material delivery apparatus 12 includes a material delivery device 50 operably connected to the supply end 72 of a delivery tube 70 and a supply 52 operably connected to the material delivery device 50, with the supply 52 configured to contain material for delivery to the bird.

The material delivery device 50 as provided in a material delivery apparatus 12 of a material delivery system as described herein may take any suitable form depending at least in part on the form of the materials being delivered. Examples of potentially suitable material delivery devices that may be used to move material from the supply 52 through the delivery tube 70 may include, but are not limited to, peristaltic pumps, diaphragm pumps, gear pumps, expandable bladders, gravity fed arrangements (such that material in the supply drains into the delivery tube 70 under the force of gravity, with control over material delivery being performed using one or more valves), pneumatic delivery using pressurized air or other gases, etc.

Material from the supply 52 moves through one or more lumens in delivery tube 70 from its supply end 72 to its delivery end 74. Material exiting the delivery end 74 of delivery tube 70 is delivered into the digestive tract of a bird when the delivery tube 70 is properly located to deliver that material into the digestive tract of a bird.

The illustrative embodiment of material delivery apparatus 12 also includes a delivery tube driver 60 configured to move the delivery tube 70 between a retracted position and a delivery position, wherein the delivery end 74 of the delivery tube 70 is located in the digestive tract of a bird restrained in the carrier in the delivery location of the system and beak of the bird is open.

In the depicted illustrative embodiment of the system for delivering material to a bird as depicted in FIG. 1, the control unit 14 is operably connected to the beak opening actuator 20 and the delivery tube driver 60. The control unit 14 is configured to operate the beak opening actuator 20 to move the beak splitter 22 between its home position and its opening position. The control unit 14 is further configured to operate the delivery tube driver 60 to move the delivery tube 70 between its retracted position and its delivery position.

In the depicted illustrative embodiment, control unit 14 is further operably connected to the open beak sensor 30 and the beak tip detector 40 in the beak opening apparatus 10, as well as being operably connected to the material delivery device 50 in the material delivery apparatus 12.

In one or more embodiments of a material delivery apparatus of a material delivery system as described herein, the delivery end 74 of the delivery tube 70 may include an enlarged tip having a maximum tip dimension measured transverse to a delivery tube axis 71 that extends from the supply end 72 to the delivery end 74 of the delivery tube 70. In one or more embodiments, the delivery tube 70 comprises a maximum tube dimension measured transverse to the delivery tube axis 71 at a junction between the delivery tube 70 and the enlarged tip proximal of the enlarged tip at the distal end 74, with the maximum tip dimension of the delivery end 74 being larger than the maximum tube dimension.

In one or more embodiments, the enlarged tip at the delivery end 74 of the delivery tube 70 may have a rounded leading surface. In one or more embodiments, providing a rounded leading surface at the delivery end 74 of the delivery tube 70 may reduce the likelihood of injury or trauma as the delivery end 74 of the delivery tube 70 moves through the oral cavity and/or esophagus of a bird during delivery to the digestive tract.

In one or more embodiments of a delivery tube used in connection with a material delivery apparatus of a material delivery system as described herein, wherein the delivery tube 70 includes one or more lumens extending from the supply end 72 to the delivery end 74 of the delivery tube 70. If the delivery tube 70 includes an enlarged tip as described herein, the lumen may extend through the enlarged tip.

With reference to FIG. 1, one or more embodiments of a delivery tube 70 used in connection with a material delivery apparatus of a material delivery system as described herein may include a delivery end section 76 extending from the delivery end 74 towards the supply end 72. In such an embodiment, the delivery end section 76 may have a length of 15 centimeters or less, 10 centimeters or less, or 5 centimeters or less. In one or more embodiments, the delivery tube 70 may also include a supply end section 78 extending from the supply end 72 towards the delivery end 74. In such an embodiment, the supply end section 78 may have a length of 15 centimeters or less, 10 centimeters or less, or 5 centimeters or less. The delivery tube 70 may further include an optional intermediate section 77 located between the supply end section 78 and the delivery end section 76. In embodiments of a delivery tube used in a material delivery apparatus of a material delivery system as described herein that include a delivery end section, the delivery end section 76 may have properties that reduce or limit the likelihood of causing injury or trauma to a bird as the delivery tube is moved from its retracted position to its delivery position. In one or more embodiments, the delivery end section 76 may be described as having a maximum bending resistance that is lower than a maximum bending resistance of the supply end section 78, such that the delivery end section 76 is more supple or easily bent as compared to the supply end section 78 and, in one or more embodiments, as compared to the optional intermediate section 77.

One or more embodiments of delivery tubes used in a material delivery apparatus of a material delivery system as described herein may include a delivery end section 76 extending from the delivery end 74 towards the supply end, and a supply end section 78 extending from the supply end 72 towards the delivery end section 76. In, for example, embodiments that do not include an intermediate section, the delivery end section 76 may have a delivery end section length measured from the delivery end 74 to a distal end of the supply end section 78, and the supply end section 78 may have a supply end section length measured from the supply end 72 to a proximal end of the delivery end section 76. In embodiments that do not include an intermediate section, the delivery end section 76 and the supply end section 78 meet at the distal end of the supply end section 78 and the proximal end of the supply end section 78. Further, in one or more embodiments, the delivery end section length may be equal to or greater than the supply end section length.

Although the bending resistance of the delivery end section 76 of a delivery tube as described herein may be constant throughout the length of the delivery end section 76, in one or more embodiments of a delivery tube as described herein, a bending resistance of the delivery end section 76 of the delivery tube 70 decreases when moving towards the delivery end 74 of the delivery tube 70 along the delivery end section 76 such that the bending resistance of the delivery tube 70 at a proximal end of the delivery end section 76 is larger than the bending resistance of the delivery tube 70 proximate the delivery end 74.

In one or more embodiments of a delivery tube as described herein, a bending resistance of the delivery end section 76 of the delivery tube 70, the delivery end section 76 may be described as having a proximal portion that extends from the intermediate section 77 towards the delivery end 74, with the proximal portion occupying 30% or less, 20% or less, or 10% or less of a length of the delivery end section 76 and, further, the delivery end section 76 may be described as having a distal portion that extends from the delivery end 74 towards the intermediate section 77, with the distal portion occupying 30% or less, 20% or less, or 10% or less of a length of the delivery end section. In such embodiments, the distal portion of the delivery end section 76 may have a maximum bending resistance that is lower than a maximum bending resistance of the proximal portion of the delivery end section 76.

The beak opening apparatus included in one or more embodiments of a material delivery system as described herein may include a beak splitter 22 that is configured to direct the delivery end 74 of the delivery tube 70 into the digestive tract of the bird when the bird is restrained in the carrier in the delivery location and beak of the bird is open. In one or more embodiments, the delivery end 74 of the delivery tube 70 may be closer to the beak splitter 22 when the delivery tube 70 is in the retracted position than when the delivery tube 70 is in the delivery position.

In one or more embodiments, the beak splitter 22 may include a delivery tube passageway formed therethrough (see, for example, passageway 123 in FIG. 8), with the delivery tube 70 moving within the delivery tube passageway when the delivery tube 70 moves between the retracted position and the delivery position.

In one or more embodiments of the material delivery systems described herein, the delivery tube driver 60 is configured to move the delivery tube 70 such that, when the delivery tube 70 is in the delivery position and the bird is in the delivery location, the delivery end 74 of the delivery tube 70 is located in the esophagus just proximal of the crop and/or in the crop of the bird. In one or more alternative embodiments, the delivery end 74 of the delivery tube 70 may be located sufficiently within the digestive tract of the bird (for example, in the mouth/oral cavity, esophagus, etc.) such that any material delivered through the delivery end 74 of the delivery tube 70 remains in the digestive tract of the bird after removal of the delivery tube 70.

As discussed herein, one or more embodiments of the beak opening apparatus 10 that may be provided alone or in a material delivery system as described herein may include an open beak sensor apparatus 30 configured to detect when the beak of the bird restrained in the carrier in the delivery location is open. In one or more embodiments, the open beak sensor apparatus maybe in the form of one or more of: an optical source and an optical sensor, a proximity detector, an ultrasonic detector, a mechanical switch, etc. In one or more embodiments, the open beak sensor apparatus 30 may be operably connected to the control unit 14 of a material delivery system and configured to provide a signal to the control unit indicating that the beak of a bird restrained in the carrier in the delivery location is open (or, alternatively, that the beak of a bird restrained in the carrier in the delivery location is not open).

One illustrative embodiment of an open beak sensor apparatus that may be used in a beak opening apparatus as described herein may be in the form of an optical source and a pair of optical sensors. In such an arrangement, a first optical sensor of the pair of optical sensors may be positioned such that the lower mandible of the beak of a bird restrained in the carrier in the delivery location blocks light emitted by the optical source from reaching the first optical sensor when the beak of the bird restrained in the carrier in the delivery location is open. Such an arrangement may also include a second optical sensor positioned such that the upper mandible of the beak of a bird restrained in the carrier in the delivery location blocks light emitted by the optical source from reaching the second optical sensor when the beak of the bird restrained in the carrier in the delivery location is open. As discussed herein, each of the optical sensors may be operably connected to the control unit to provide a signal indicating blockage of the light emitted by the optical source or, alternatively, reception of light from the optical source which would indicate that the beak of the bird is not open.

As discussed herein, one or more embodiments of the beak opening apparatus 10 that may be provided alone or in a material delivery system as described herein may include a beak tip detector 40 configured to detect the tip of the upper mandible of the beak of a bird restrained in a carrier in a delivery location relative to the system. In one or more embodiments, the beak tip detector 40 is operably connected to the control unit 14, with the control unit 14 being configured to receive a signal from the beak tip detector 40 when the beak tip detector 40 detects the tip of the upper mandible of the beak of a bird restrained in a carrier in a delivery location relative to the system. Upon receiving the signal indicating that the tip of the upper mandible of the beak of a bird restrained in a carrier is in a delivery location relative to the system, the control unit 14 may further be configured to operate the beak opening actuator 10 to move the beak splitter 22 between its home position and its opening position. In one or more embodiments, the beak tip detector may include one or more of: an optical source and optical detector, a proximity detector, an ultrasonic detector, a mechanical detector, etc.

As discussed herein, one or more embodiments of the beak opening apparatus 10 that may be provided alone or in a material delivery system as described herein may include a beak splitter 22 that is shaped to contact the upper mandible of the beak of a bird restrained in a carrier in a delivery location relative to the system before the beak splitter contacts the lower mandible when the beak splitter is moving from the home position to the opening position. In one or more embodiments, the beak splitter 22 may move along an arcuate path when moving between its home position and its opening position. That arcuate path may, in one or more embodiments, facilitate initial contact with the upper mandible of the beak of a bird restrained in a carrier in a delivery location relative to the system and, further, may also facilitate movement of the upper mandible such that the beak splitter 22 can enter and expand a gap between the upper and lower mandibles of the beak.

Although the beak opening actuator 20 is described as moving the beak splitter 22, in one or more embodiments, the beak splitter 22 may be located on a beak opening carriage, with the beak opening actuator 20 being operably connected to the beak opening carriage. In such an arrangement, the beak opening carriage may be is movable between a carriage home position and a carriage opening position, with the beak splitter 22 being in the home position when the beak opening carriage is in the carriage home position, and the beak splitter 22 being in the opening position when the beak opening carriage is in the carriage opening position.

Various illustrative embodiments of different components that may be provided in material delivery systems and/or beak opening apparatus as described herein are depicted in FIGS. 2-10 where like reference numbers in the various figures denote features found in the illustrative embodiment of the material delivery system depicted therein. For reference, a Cartesian coordinate system is provided in each of FIGS. 2-10 to assist in understanding the various features/components depicted therein, as well as their positions relative to each other.

Figure 2:
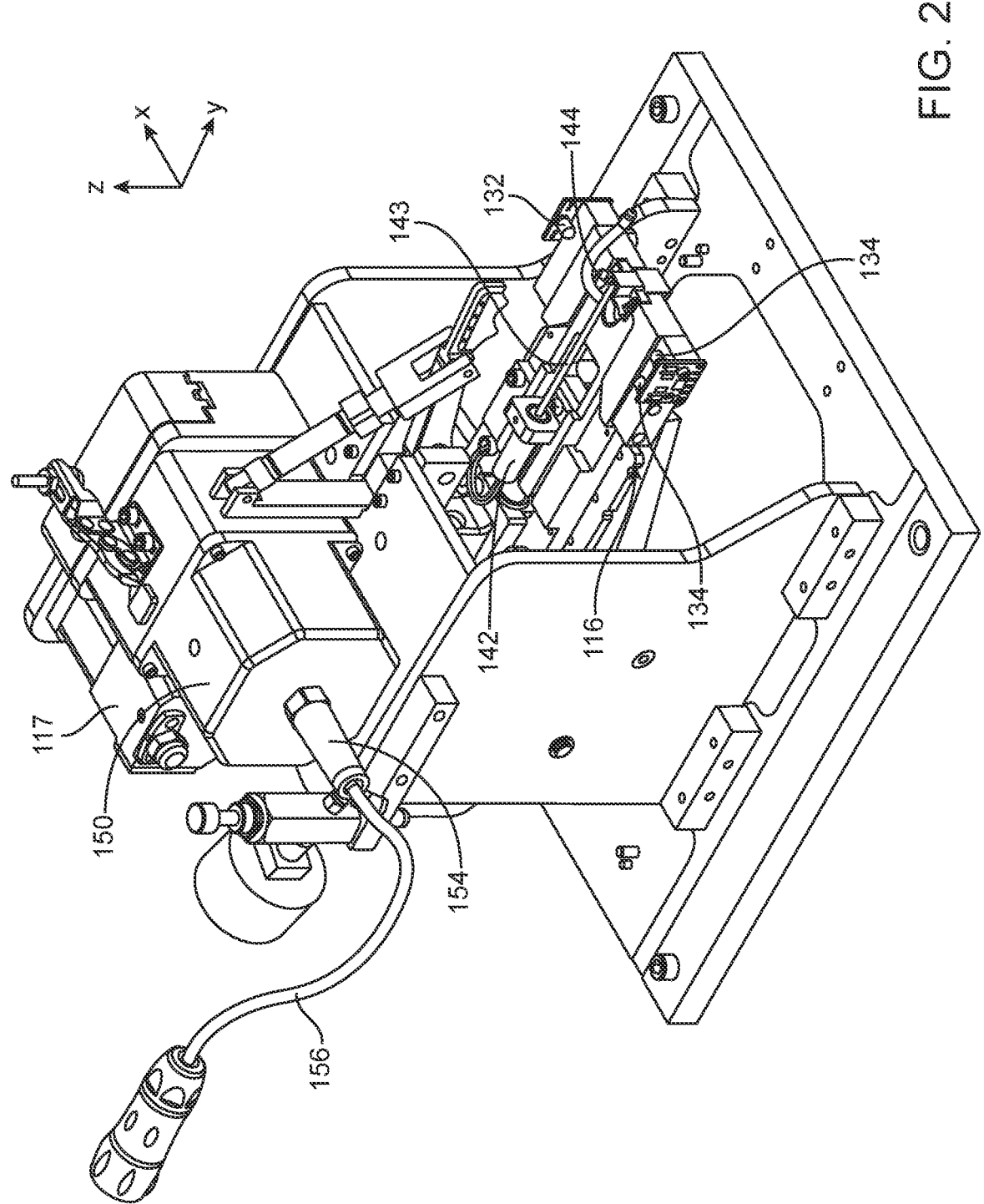
FIG. 2 is a perspective view of a portion of one illustrative embodiment of a material delivery system as described herein.

A perspective view of one illustrative embodiment of a material delivery system is depicted in FIG. 2. The system includes a material delivery device 150 having a port 154 to which supply line 156 is connected. The opposite end of supply line 156 may be connected to a supply of material to be delivered to a bird as described herein.

As seen in FIG. 2, the illustrative system includes a beak opening carriage 116 on which a beak splitter is positioned (although not visible in the view of FIG. 2). The beak opening carriage 116 is operably connected to one embodiment of a beak opening actuator 117 which, in the depicted embodiment, is connected via belts and other mechanisms to the carriage 116 to move the beak splitter between its home and opening positions as described herein.

Another feature depicted in the view of FIG. 2 include an open beak sensor apparatus in the form of an optical source 132 and a pair of optical sensors 134 positioned to receive light emitted by optical source 132 in the absence of a beak located therebetween. As will be described further herein, the optical sensors 134 are also positioned such that light emitted by the optical source 132 is blocked from reaching optical sensors 134 when the beak of a bird located in a delivery position of the system is open such that the upper and lower mandibles of the bird's beak block light emitted by the optical source 132.

The illustrative embodiment of the material delivery system depicted in FIG. 2 also includes a beak tip detector in the form of an optical source 142 and an optical detector 144 which are positioned such that the tip of a beak of a bird located in a delivery position of the system blocks at least a portion of the light emitted from optical source 142 from reaching optical detector 144. In one or more embodiments of systems as described herein, the optical source 142 may be a laser or other source capable of emitting a collimated beam 143 of light in the direction of sensor 144.

Figure 3:
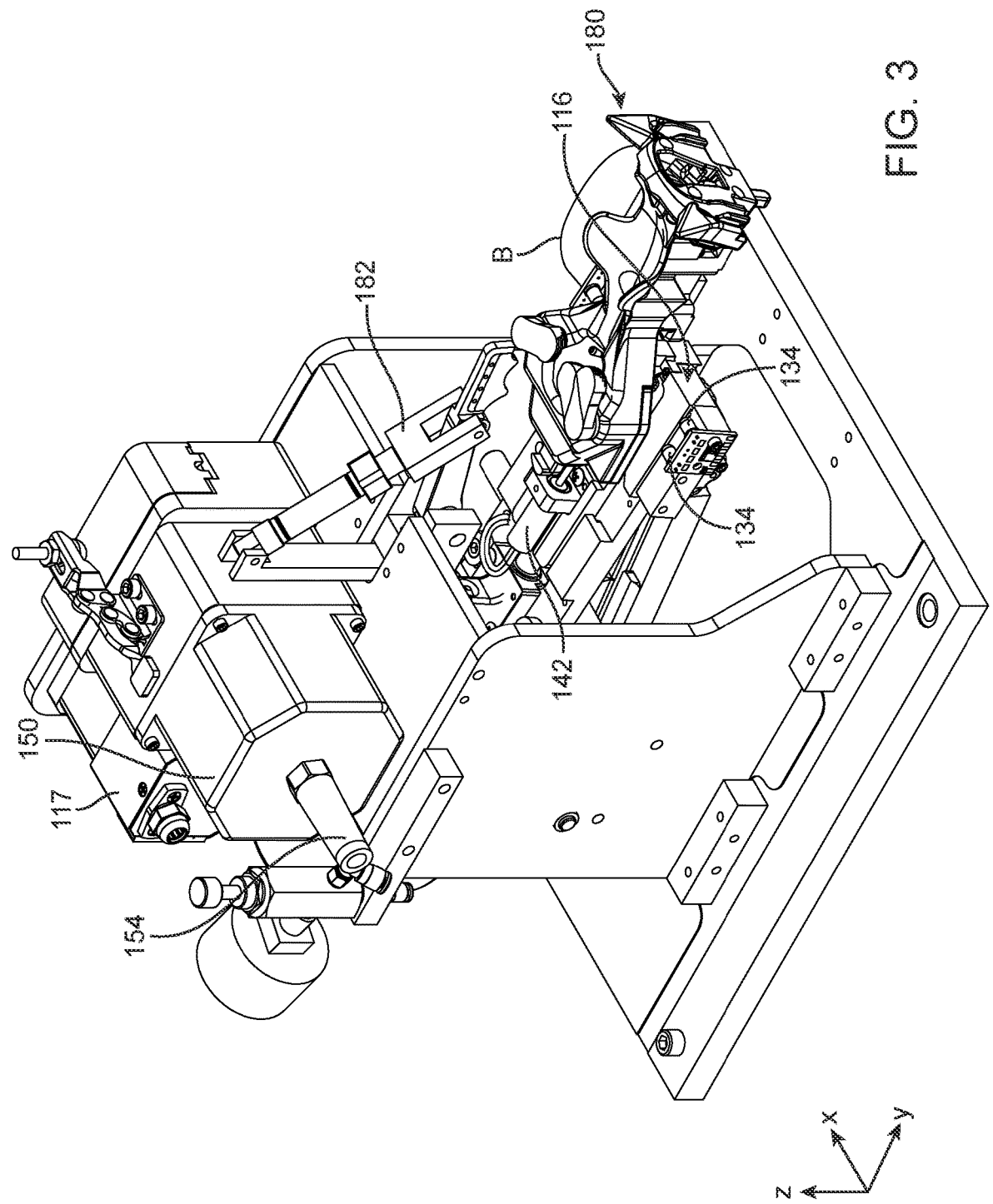
FIG. 3 is a perspective view of the illustrative embodiment of the material delivery system depicted in FIG. 2 with a bird restrained in a carrier in a delivery location relative to the material delivery system, wherein the bird is depicted in phantom lines to allow visualization of underlying features of the material delivery system and/or carrier.
Figure 4:
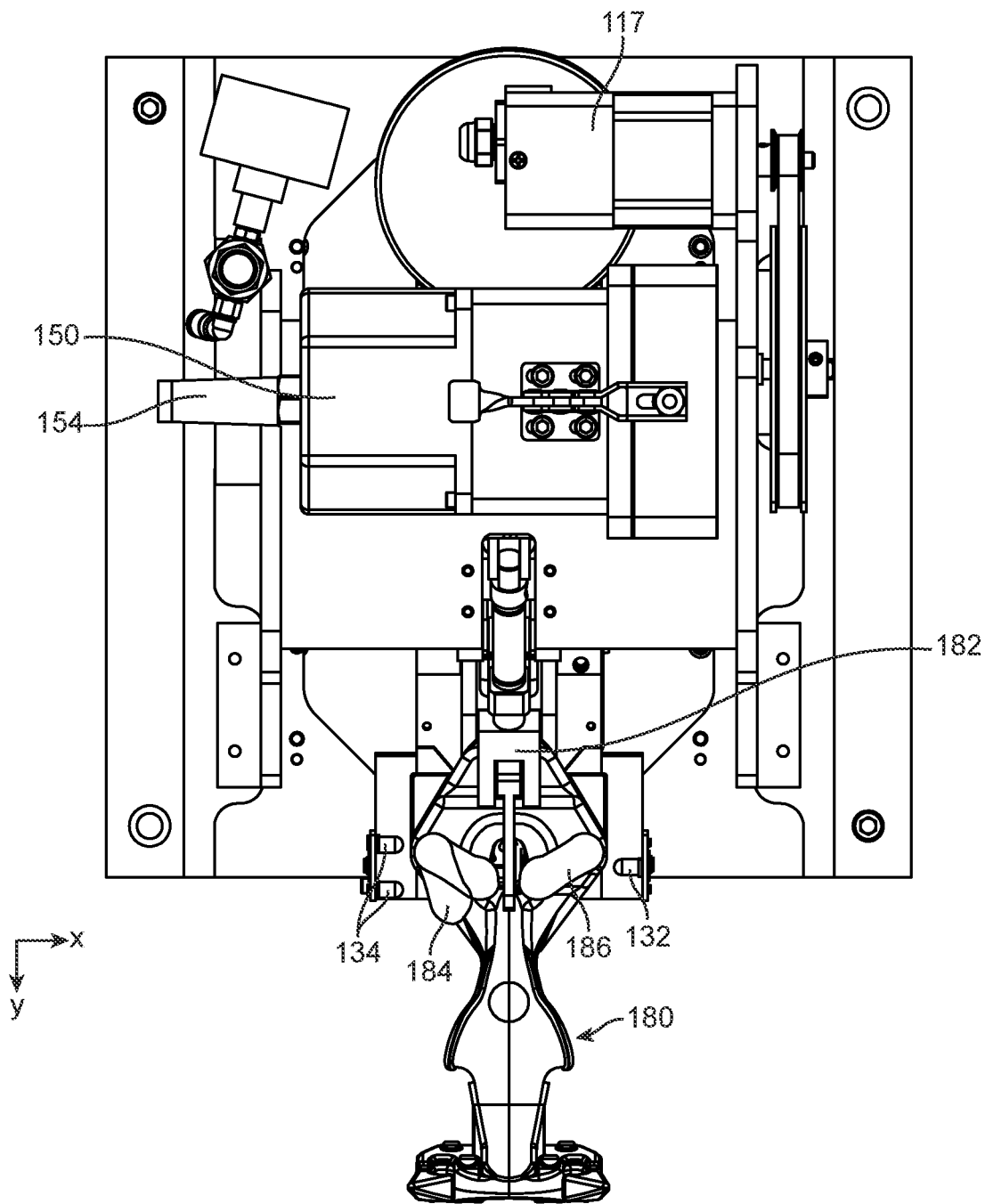
FIG. 4 is a top plan view of the illustrative material delivery system depicted in FIG. 2 taken along the z-axis.
Figure 5:
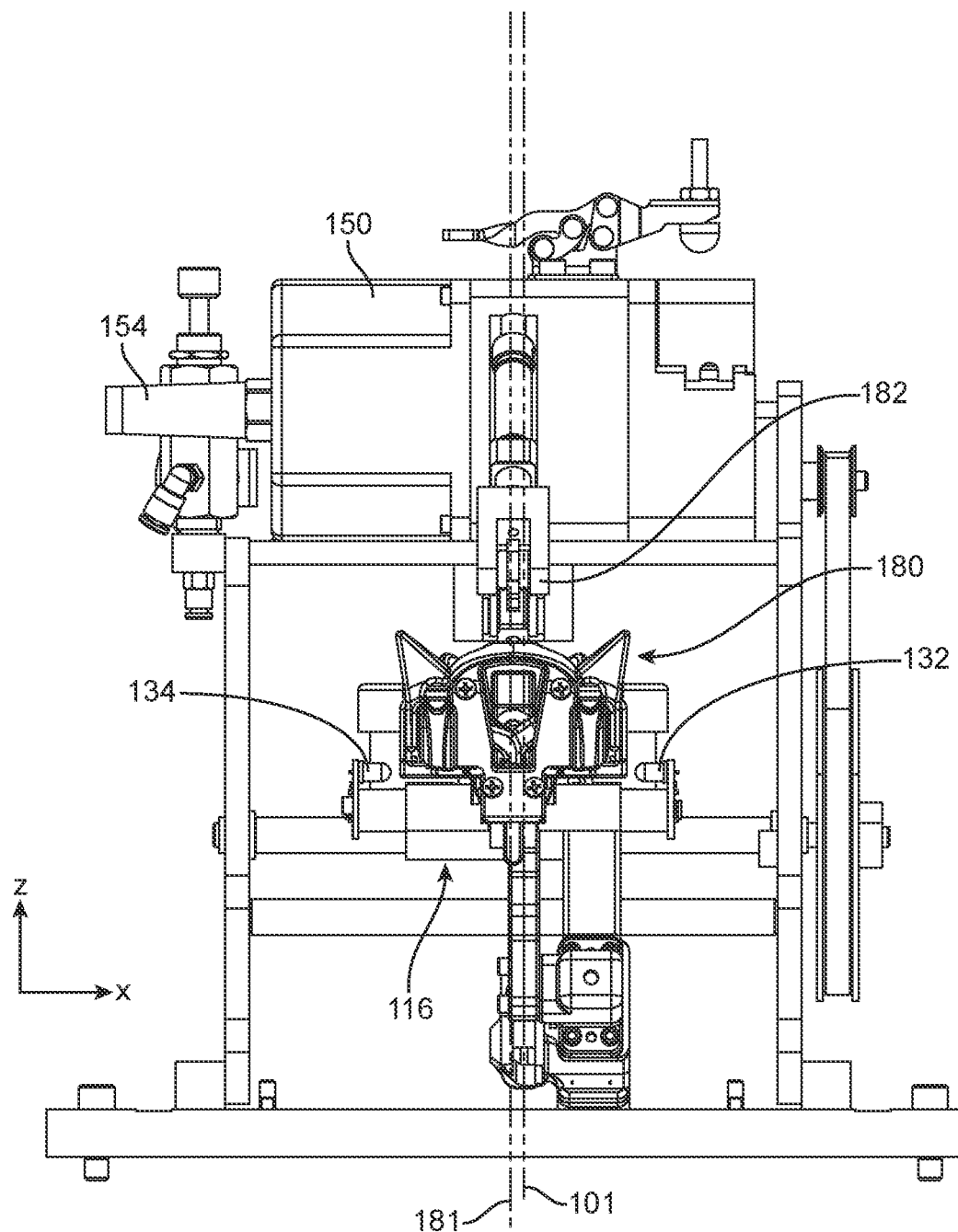
FIG. 5 is a side view of the illustrative material delivery system depicted in FIGS. 2 and 4 taken along the y-axis.

The illustrative embodiment of the material delivery system depicted in FIG. 2 is also depicted in FIGS. 3-5 with the addition of an optional carrier 180 that may be used to restrain a bird in a material delivery system and/or beak opening apparatus as described herein. In particular, the carrier 180 is restraining a bird B in phantom lines in FIG. 3 such that the features of the carrier 180 are visible through the bird B. A bird B restrained in the carrier 180 is in the delivery position relative to the remainder of the material delivery system as described herein. Although the carrier 180 alone may be sufficient to restrain a bird in the delivery position, one or more embodiments of material delivery systems as described herein may include a secondary restraint 182 configured to provide additional restraint to the head of the bird B when the bird is in the delivery position relative to the remainder of the system. Further, in one or more embodiments of the systems and apparatus described herein, a bird may be positioned in the delivery location without a carrier, for example, manually or by some other apparatus.

The carrier 180 depicted in, for example, FIGS. 3-5 may, in one or more embodiments, be similar to those depicted and described in U.S. Pat. No. 5,651,731 (Gorans et al.), U.S. Pat. No. 7,232,50 (Gorans et al.), U.S. Pat. No. 7,363,881 (Gorans et al.), etc., with each of the depicted illustrative embodiment of bird restraint apparatus including a beak/head cavity and a pair of arms 184 and 186 that rotate into and out of position to retain the head of a bird in the carrier 180 or to release the head of the bird from the carrier 180. Rotation of the illustrative embodiment of arms 184 and 186 in carrier 180 is depicted by the dual positions of arm 184 as seen in, for example, FIG. 4.

The carriers used in one or more embodiments of the material delivery systems and/or beak opening apparatus described herein may, however, take many different forms. Functionally, the carriers need only restrain a bird in position relative to the material delivery system and/or beak opening system in a manner that allows for the beak opening apparatus and/or material delivery apparatus to operate as described herein. Potentially suitable alternative carriers may include those described in, for example, US Patent Application Publication No. US 2012/0012070 (Gorans et al.) although many other alternative carriers may also be used in place of the carriers depicted in, for example, FIGS. 3-5.

Further, carriers may be used to move birds into and out of a delivery position with respect to a material delivery system and/or beak opening apparatus as described herein in a rotary manner using, for example, a rotating turntable as seen in, for example, U.S. Pat. No. 5,651,731 (Gorans et al.). In other examples, the carriers may be used to move birds into and out of a delivery position with respect to a material delivery system and/or beak opening apparatus using any suitable processing system and/or method such as those described in, for example, U.S. Pat. No. 7,367,284 (Gorans), titled AUTOMATED POULTRY PROCESSING METHOD AND SYSTEM.

Another feature that may be found in one or more embodiments of material delivery systems as described herein may be described with reference to FIG. 5 where an offset between a midline of a bird restrained in the carrier 180 in the delivery position is offset from the position of the delivery end a delivery tube used to deliver material to a bird positioned in the delivery location (using, for example, a carrier 180). The position of the midline of a bird in the delivery location is illustrated by axis 181 in FIG. 5, while the location at which the delivery end of the delivery tube would enter the opened beak of the bird is illustrated by axis 101 in FIG. 5. In one or more embodiments, the delivery end of a delivery tube may move along a path located on a plane defined by axis 101, but that limitation is not required in all embodiments of the present invention.

The offset between the delivery end of the delivery tube and the midline of the bird into which the delivery tube is to be inserted may, for example, improve delivery of the delivery tube by offsetting the delivery end of the delivery tube from a center of the oral cavity along the midline of the bird positioned in the delivery location.

Figure 6:
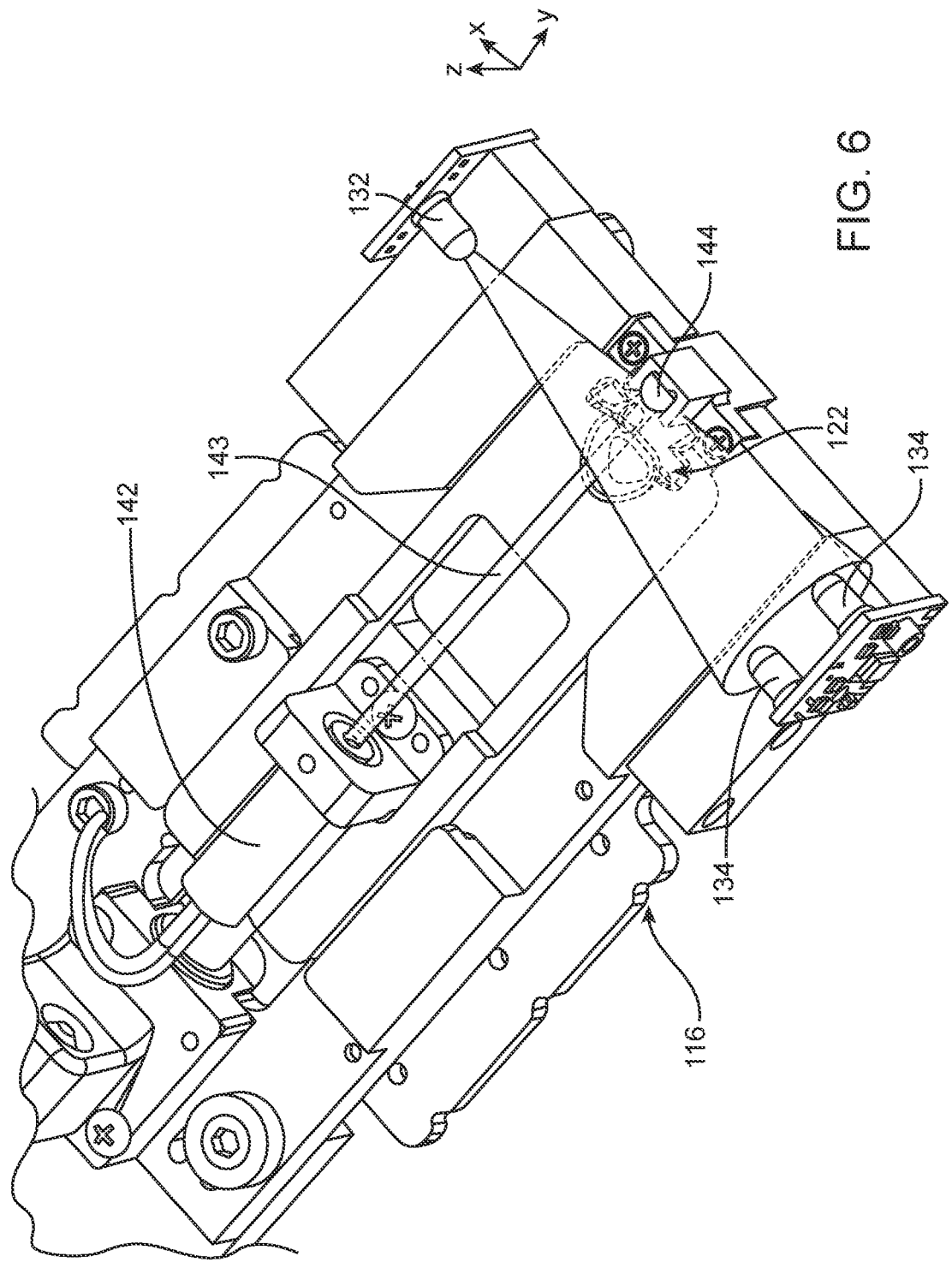
FIG. 6 is an enlarged perspective view of a portion of the illustrative material delivery system depicted in FIGS. 2, 4, and 5.

FIG. 6 is an enlarged perspective view of the delivery location of the illustrative embodiment of the material delivery system depicted in FIGS. 2-10 in the absence of a bird to allow visualization of various features of the material delivery system. As seen in this view, one illustrative embodiment of an open beak sensor apparatus in the form of an optical source 132 and a pair of optical sensors 134 are positioned on the carriage 116. The optical sensors 134 are positioned to receive light 133 emitted by optical source 132 in the absence of a beak located therebetween. As will be described further herein, the optical sensors 134 are also positioned such that light emitted by the optical source 132 is blocked from reaching optical sensors 134 when the beak of a bird located in a delivery position of the system is open such that the upper and lower mandibles of the bird's beak block light emitted by the optical source 132. The depicted optical source 132 emits light in a cone-shaped pattern, although it should be understood that alternative embodiments of open beak sensor apparatus may take many other forms such as, for example, one or more sources of collimated light directed at each of the optical sensors 134.

The illustrative embodiment of the material delivery system depicted in FIG. 6 also depicts more details of the beak tip detector in the form of an optical source 142 and an optical detector 144 which are positioned such that the tip of a beak of a bird located in a delivery position of the system blocks at least a portion of the light emitted from optical source 142 from reaching optical detector 144. As discussed above, one or more embodiments of systems as described herein may include a beak tip detector having an optical source 142 in the form of a laser or other source capable of emitting a collimated beam 143 of light in the direction of sensor 144. As discussed herein, however, the beak tip detectors used in material delivery systems and/or beak opening apparatus as described herein may take many other forms.

Figure 7:
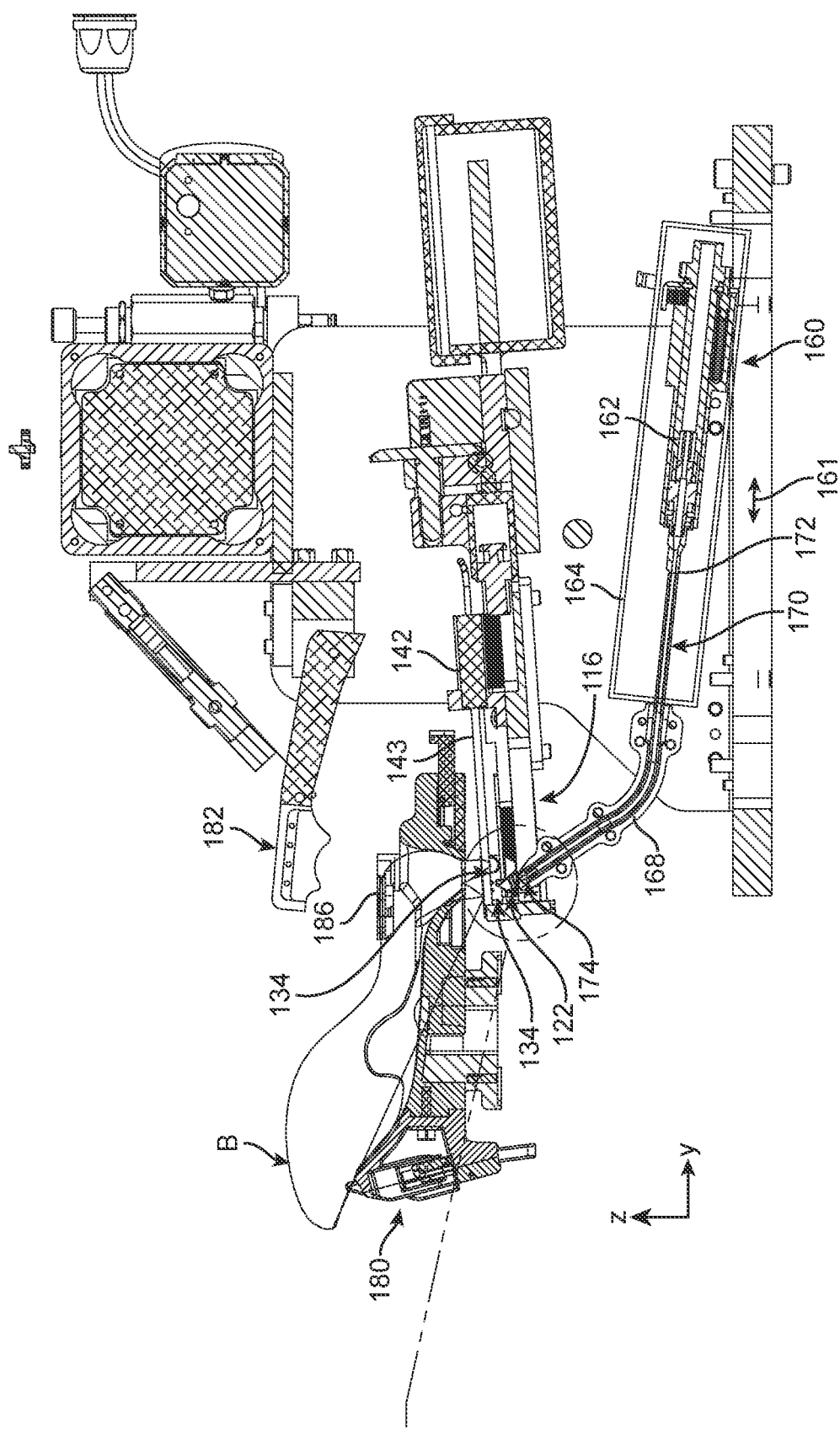
FIG. 7 is a side view of the material delivery system depicted in FIGS. 2-6 taken along the x-axis with the bird restrained in a carrier located in the delivery location relative to the material delivery system and the illustrative embodiment of beak splitter of the illustrative embodiment of the beak opening apparatus in a home position.

FIG. 7 is a side view of the illustrative embodiment of the material delivery system depicted in FIGS. 2-10 taken along the x-axis with the bird positioned in the delivery location relative to the material delivery system (in, as depicted, an optional carrier 180) and the illustrative embodiment of beak splitter of the illustrative embodiment of the beak opening apparatus in a home position.

In particular, the bird B is in the delivery location relative to the material delivery system as seen in FIG. 7. As the bird B is moved into that delivery location, the tip of the bird's beak is detected using the light 143 emitted by optical source 142. Upon detection of the tip of the bird's beak, the carriage 116 may be rotated upward such that the beak splitter 122 is moved from its home position as seen in FIG. 7 towards the beak of the bird B.

Other features depicted in the view of FIG. 7 include components used to move the delivery tube 170 from its retracted position to its delivery position. In particular, delivery tube 170. The delivery tube 170 includes, as described herein, a supply end 172 and a delivery end 174. The supply end 172 is connected to the delivery tube driver 160 which, in the depicted illustrative embodiment, includes a piston 162 which moves within a housing 164 to move the delivery tube 170 between its retracted position (as seen in FIG. 7) to its delivery position.

In the depicted illustrative embodiment, delivery tube 170 passes through a delivery tube guide 168 to provide accurate and repeatable positioning of the delivery end 174 of the delivery tube relative to the beak splitter 122.

Figure 8:
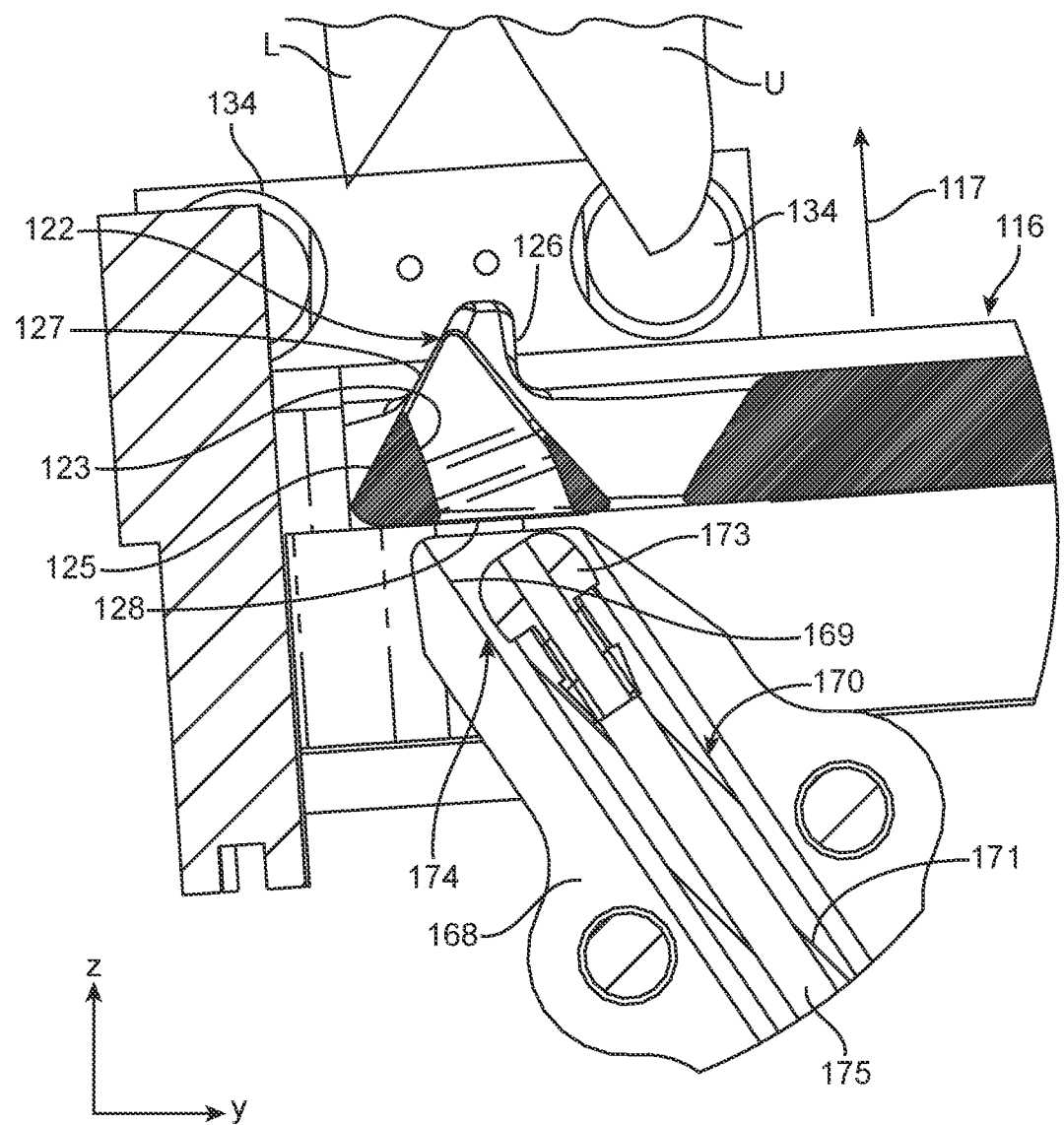
FIG. 8 is an enlarged view of a portion of the material delivery system depicted in FIG. 7 depicting the beak splitter in its home position and the illustrative embodiment of delivery tube in a retracted position.

FIG. 8 is an enlarged view of a portion of the material delivery system depicted in FIG. 7 depicting the beak splitter 122 positioned on carriage 116 for movement along an arcuate path 117 from its home position and the illustrative embodiment of delivery tube 170 in its retracted position with the delivery end 174 of delivery tube 170 positioned proximate the beak splitter 122.

The terminal end of the delivery tube guide 168 is seen in FIG. 8, with the delivery tube guide 168 including a lumen 169 through which delivery tube 170 moves when moving from its retracted position to its delivery position as discussed herein.

Among the various features depicted in more detail in FIG. 8, are the construction of the delivery end 174 of the delivery tube 170. In particular, it can be seen that, in the depicted illustrative embodiment, the delivery tube 170 includes a plug 173 inserted into tubing 171 at the delivery end 174 of the delivery tube 170. In one or more embodiments, plug 173 may be described as being in the form of an enlarged tip that has a maximum tip dimension measured transverse to the delivery tube axis (where that axis is defined along the length of the delivery tube 171). That maximum tip dimension may, in one or more embodiments, be larger than the maximum tube dimension as measured transverse to the delivery tube axis. Furthermore, in one or more embodiments, the plug 173 may also provide a rounded leading surface at the delivery end of the delivery tube as seen in, for example, FIG. 8.

Plug 173 includes a lumen such that material can pass out of the lumen 175 formed within tubing 171 and, in one or more embodiments, may be made of materials that have a lower durometer and/or coefficient of friction to facilitate movement of the delivery end 174 of the delivery tube 170 into a digestive tract of a bird as discussed herein. Suitable examples of materials that may be used for the tubing 171 may include but are not limited to, one or more of polypropylene, polyvinylchloride, etc. Suitable examples of materials that may be used for the plug 173 may include but are not limited to, one or more of nylon, polyoxymethylene (for example, Delrin), polytetrafluoroethylene, etc.

The illustrative embodiment of beak splitter 122 depicted in cross-section in FIG. 8 includes a delivery tube passageway 123 that may be configured to direct the delivery end 174 of the delivery tube 170 into the digestive tract of a bird located in the delivery position of the material delivery system. In the depicted illustrative embodiment, delivery tube passageway 123 includes a lower opening 128 and an upper opening 127, with the delivery end 174 of the delivery tube 170 moving into the delivery tube passageway 123 from lower opening 128 towards upper opening 127 where the delivery end 174 exits the delivery tube passageway 123 during delivery into the digestive tract of a bird as described herein.

The beak splitter 122 depicted in FIG. 8 also includes an upper beak contact surface 126 and a lower beak contact surface 125 which, together, form a wedge suited for insertion between the upper mandible U and lower mandible L of the beak of a bird into which the delivery tube 170 is to be inserted.

In one or more embodiments, the beak splitter 122 is shaped to contact the upper mandible U of the beak of a bird restrained in a carrier in the delivery location relative to the material delivery system before the beak splitter 122 contacts the lower mandible L of the bird when the beak splitter 122 is moving from its home position to the opening position. Contact with the upper mandible U before contact with the lower mandible L may, in one or more embodiments, prevent locking of the beak in a closed position in some species (such as, for example, ducks).

Figure 9:
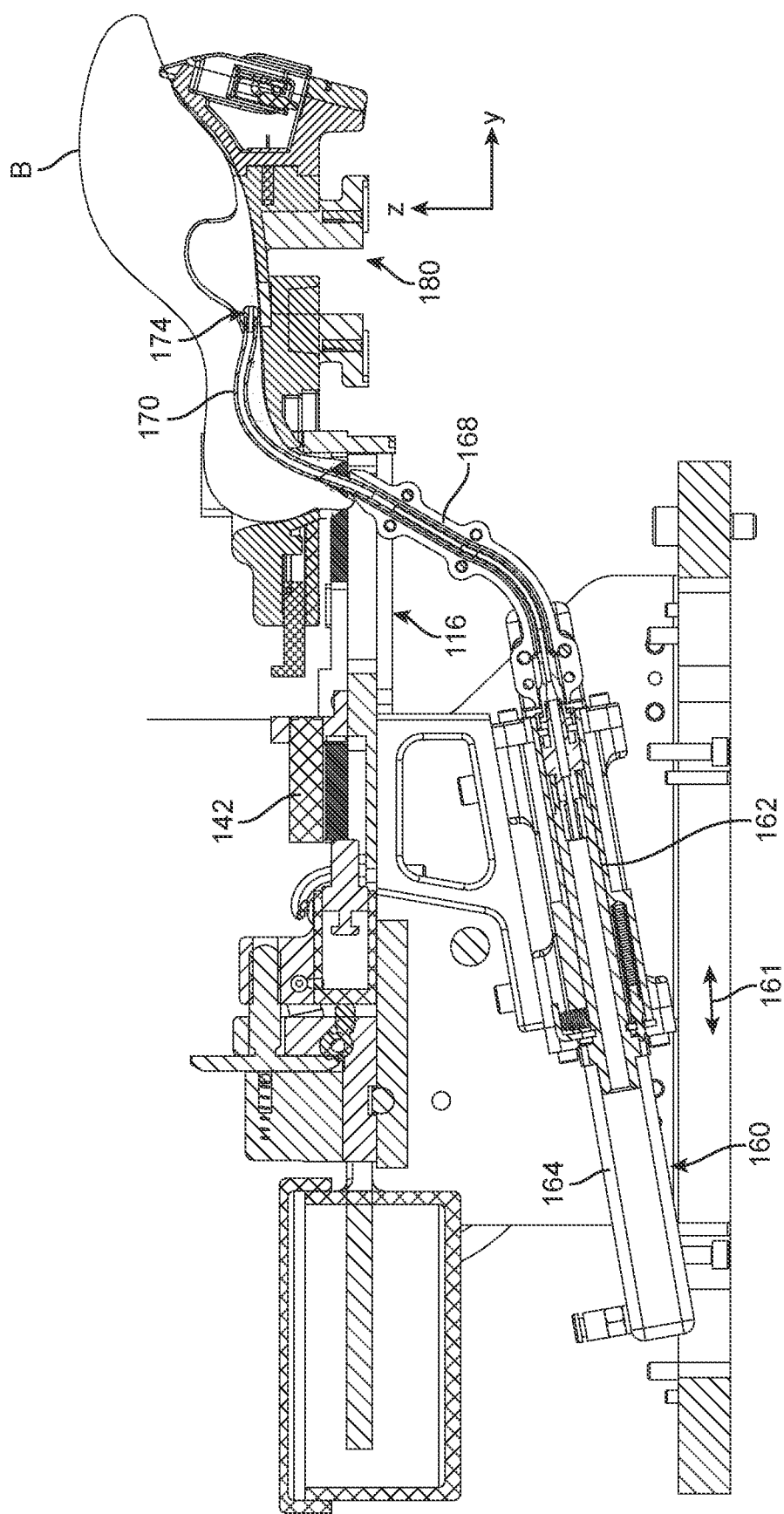
FIG. 9 is a side view of the material delivery system depicted in FIGS. 2-6 taken from an opposite side of the x-axis as compared to FIG. 7, with the bird restrained in a carrier located in the delivery location relative to the material delivery system and the illustrative embodiment of beak splitter of the illustrative embodiment of the beak opening apparatus in an opening position and the delivery tube of the material delivery apparatus in a delivery position such that the delivery end of the delivery tube is located in the digestive system of the bird.
Figure 10:
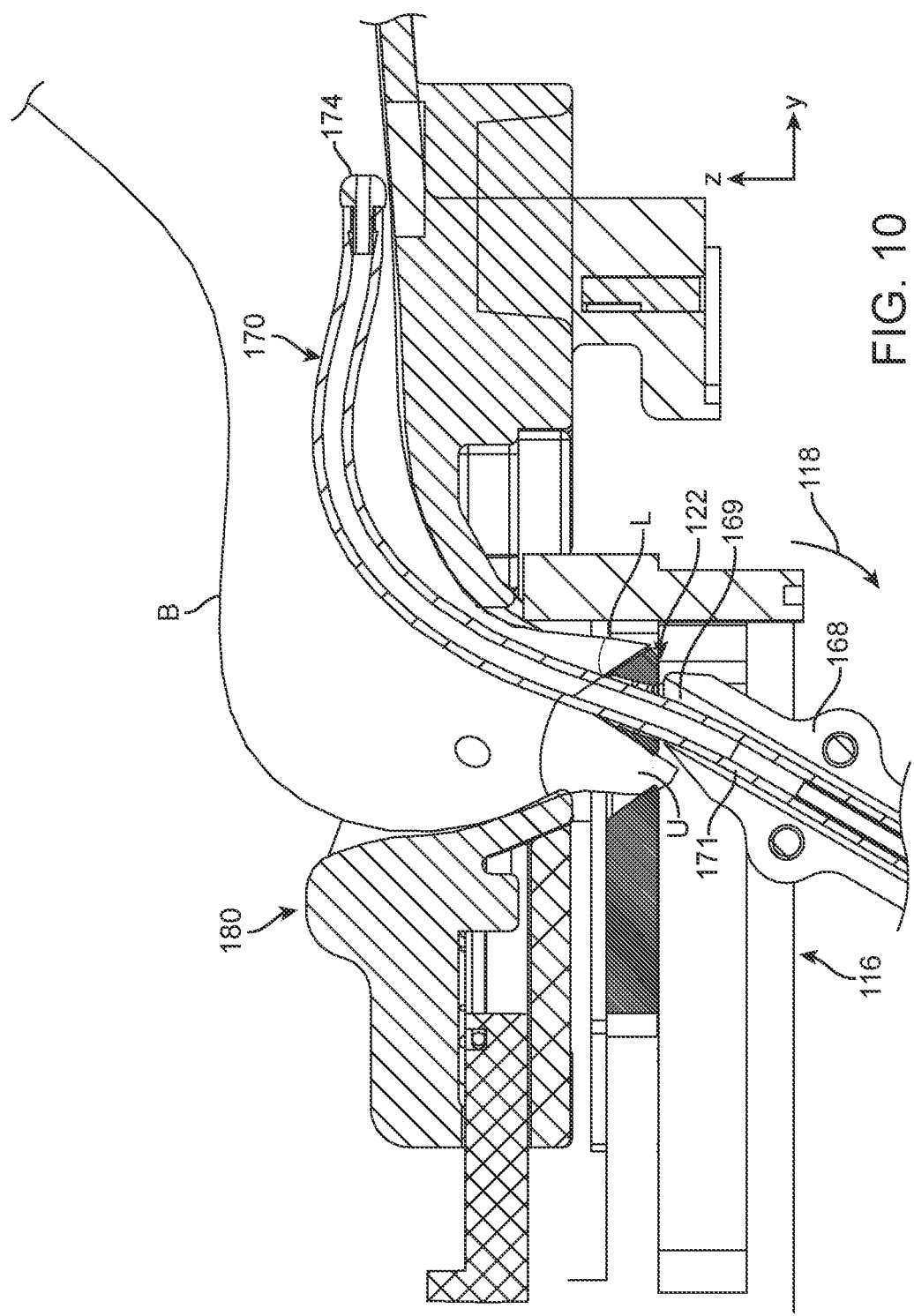
FIG. 10 is an enlarged view of a portion of the material delivery system depicted in FIG. 9 depicting the beak splitter in its opening position and the delivery tube in the delivery position such that the delivery end of the delivery tube is located in the digestive system of the bird.

The illustrative embodiment of the material delivery system depicted in the various views seen in FIGS. 2-10 is, in FIGS. 9-10, depicted with the delivery tube 170 located in the digestive tract of a bird B (restrained in an optional carrier 180) in a delivery location. In particular, FIG. 9 is a side view of the material delivery system taken from an opposite side of the x-axis as compared to FIG. 7, with the bird B restrained in the carrier 180 in the delivery location relative to the material delivery system and the illustrative embodiment of beak splitter 122 in its opening position on carriage 116.

The piston 162 of the delivery tube driver 160 is shown in a forward position within a housing 164 such that the delivery tube 170 is in its delivery position relative to the bird B. The piston 162 of delivery tube driver 160 moves in opposing directions along bidirectional arrow 161 when moving the delivery tube 170 between its retracted and delivery positions. As discussed above, delivery tube 170 moves within a delivery tube guide 168 which positions the delivery end 174 of the delivery tube 170 in its proper location with respect to beak splitter 122 as discussed herein.

FIG. 10 is an enlarged view of a portion of the material delivery system depicted in FIG. 9 depicting the beak splitter 122 in its opening position on carriage 116 and the delivery tube 170 in its delivery position such that the delivery end 174 of the delivery tube is located in the digestive system of the bird B.

In particular, the beak splitter 122 is positioned between the upper mandible U and lower mandible L of the bird B with the delivery tube 170 passing through the delivery tube aperture in the beak splitter 122 as described herein.

Upon completion of material delivery using delivery tube 170, the delivery tube 170 may be moved back into its retracted position with the delivery end 174 of delivery tube 170 being located in lumen 169 of delivery tube guide 168 such that the delivery end 174 of delivery tube 170 is located closer to the beak splitter 122.

Upon movement of the delivery tube 170 back into its retracted position, the beak splitter 122 may be moved back to its home position by, in the depicted illustrative embodiment, rotation of the carriage 116 downward away from the bird B in the direction of arrow 118 in FIG. 10.

FIGS. 11-19 depict one illustrative embodiment of a beak splitter 122 provided as a part of a carriage plate 190 that, in the depicted illustrative embodiment of the system and apparatus described herein, is mounted on the beak opening carriage 116. The focus of the descriptions of FIGS. 11-19 will focus on the beak splitter 122 with the understanding that the beak splitters of systems and/or apparatus as described herein may take a variety of different forms.

The depicted illustrative embodiment of beak splitter 122 includes an upper beak contact surface 126 and a lower beak contact surface 125 which, together, form a wedge suited for insertion between the upper mandible U and lower mandible L of the beak of a bird as described above in connection with FIG. 8. The upper beak contact surface 126 and lower beak contact surface 125 meet along the top edge 124 of beak splitter 122. Opposite ends of the top edge 124 of the beak splitter 122 may, in one or more embodiments, include guide posts 121 and 121' configured to guide and/or align the upper and/or lower mandibles of the beak of a bird being opened using the beak splitter 122. As a result, the guideposts 121 and 121' may extend upward in the Z-direction from the top edge 124 of beak splitter 122.

The depicted illustrative embodiment of beak splitter 122 is, as described herein, provided as a part of carriage plate 190. To facilitate opening of a bird's beak, carriage plate 190 may include a beak opening 192 into which the upper mandible of a beak being opened may extend during the opening process. In other alternative embodiments, however, beak opening 192 may not be required if the height of the beak splitter 122 in the Z-direction is sufficient to accommodate the length of the upper and/or lower mandibles of the beak being opened.

Figure 11:
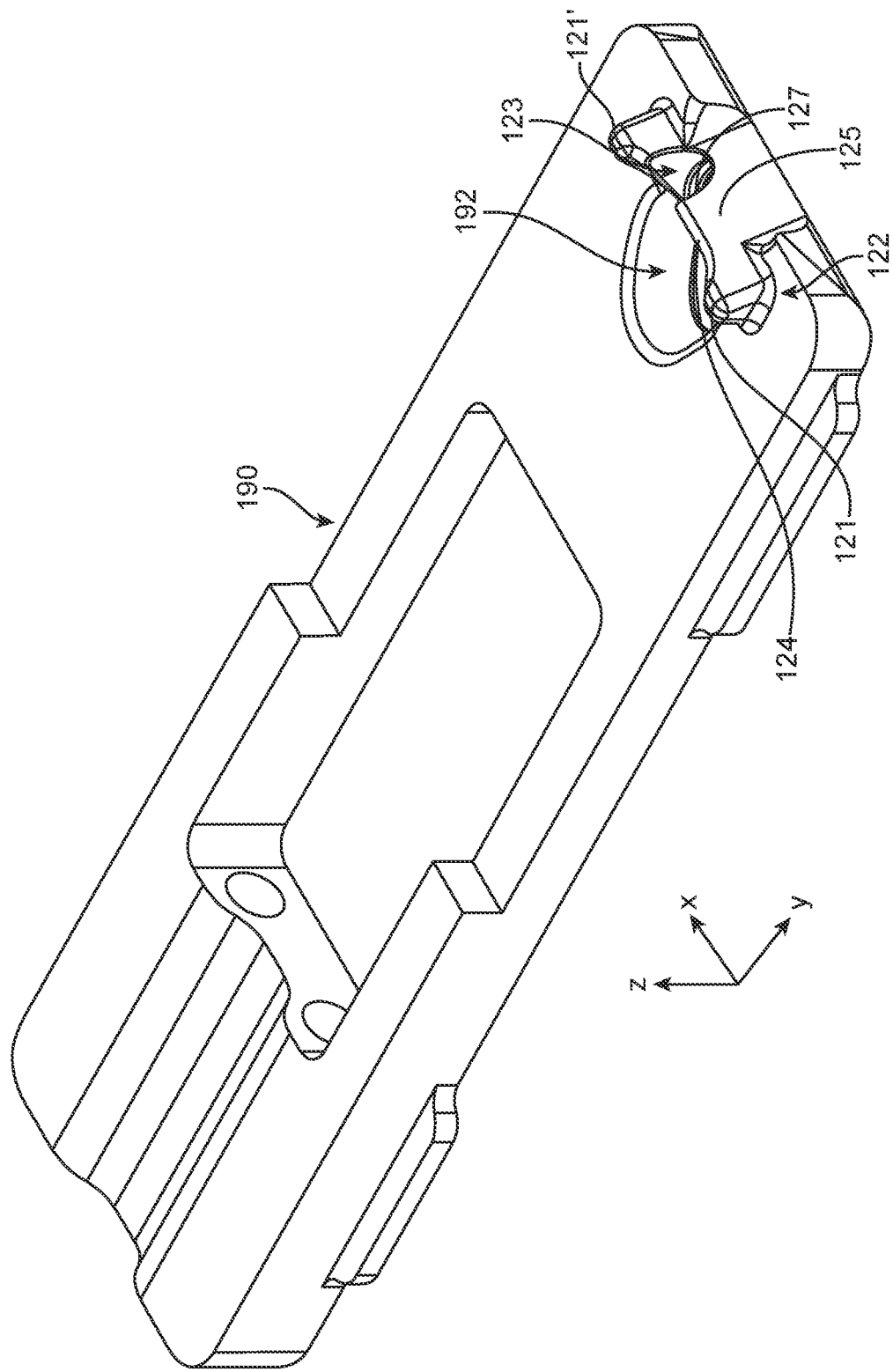
FIG. 11 is a perspective view of one illustrative embodiment of a beak splitter as described herein provided on a carriage plate.

Also depicted in FIG. 11 are the delivery tube passageway 123 extending through the beak splitter 122, with the upper opening 127 being defined in the top edge 124 as well as the upper and lower beak contact surfaces 126 and 125.

Figure 12:
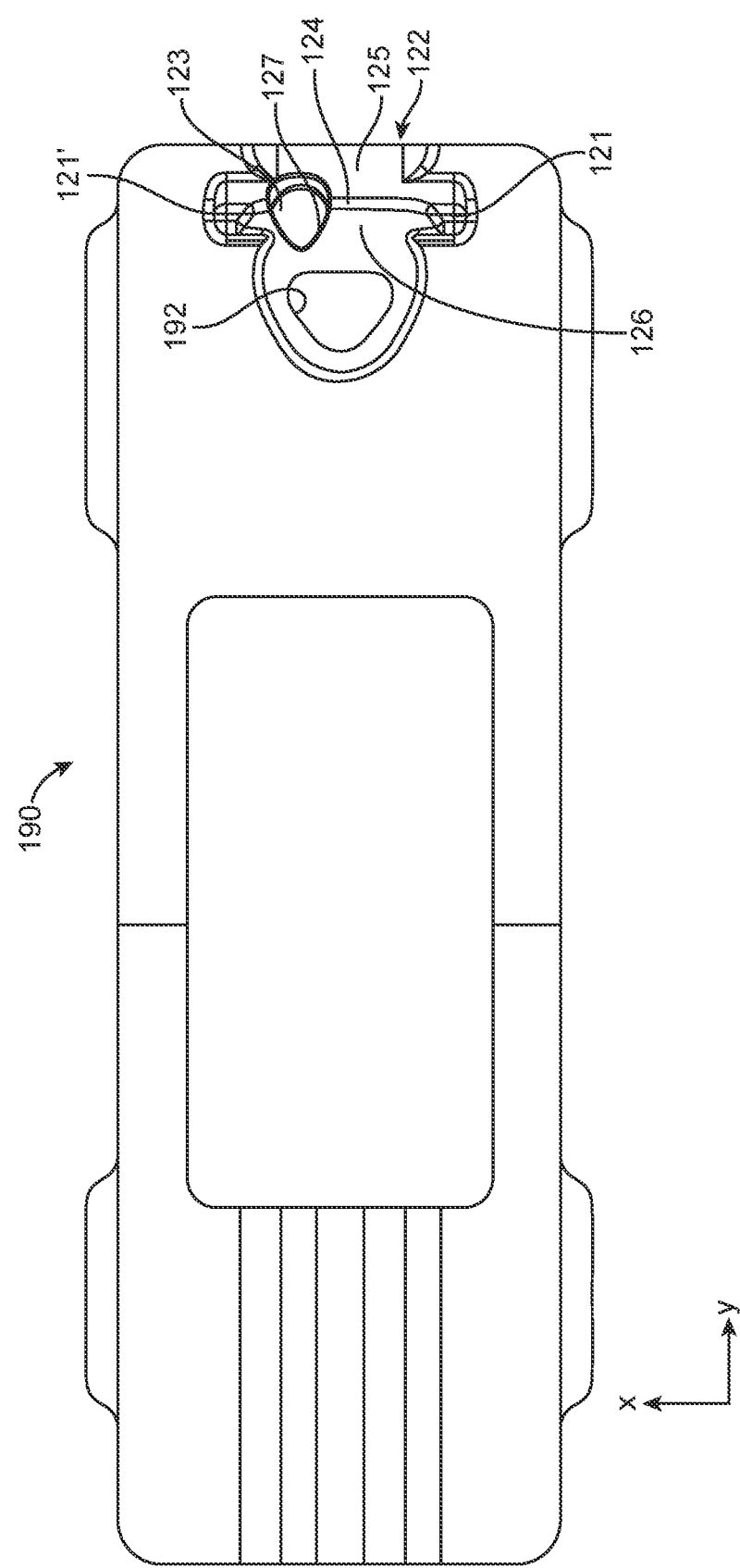
FIG. 12 is a top plan view of the carriage plate and beak splitter of FIG. 11.

FIG. 12 is a top plan view of the beak splitter 122 and carriage plate 190 of FIG. 11 with the various features of the illustrative embodiment of beak splitter 122 seen from above the carriage plate 190.

As seen in FIGS. 11-12, the upper opening 127 of delivery tube passageway 123 extending through the beak splitter 122 are offset from a midpoint of the beak splitter 122, where that midpoint is determined between left and right guideposts 121 and 121' and/or a center of the beak opening 192 in carriage plate 190. That offset may, as described elsewhere herein, deliver a tube into the oral cavity of a bird whose beak is opened using beak splitter 122 off of the bird's midline which may, in one or more embodiments, reduce the likelihood of injury to the bird during advancement and/or retraction of the delivery tube as described herein.

Figure 13:
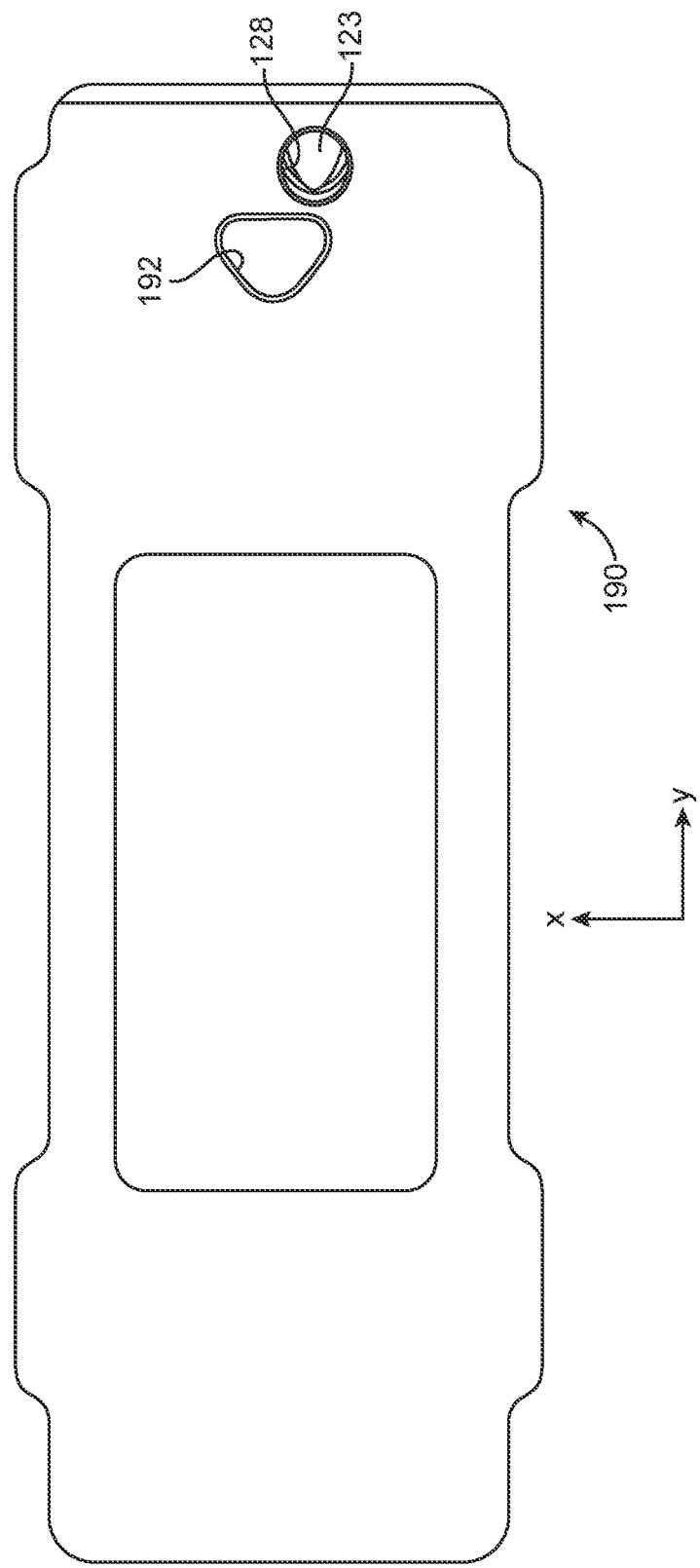
FIG. 13 is a bottom plan view of the carriage plate and beak splitter of FIG. 11.

FIG. 13 is a bottom plan view of the beak splitter 122 and carriage plate 190 of FIG. 11 where the beak opening 192 is seen, as well as the lower opening 128 of delivery tube passageway 123.

Figure 14:
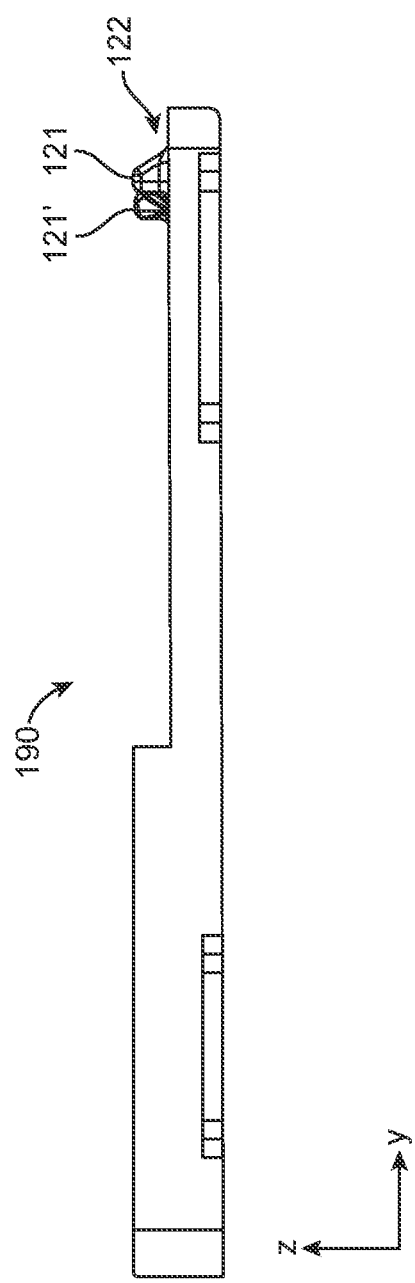
FIG. 14 is a left side view of the carriage plate and beak splitter of FIG. 11.
Figure 15:
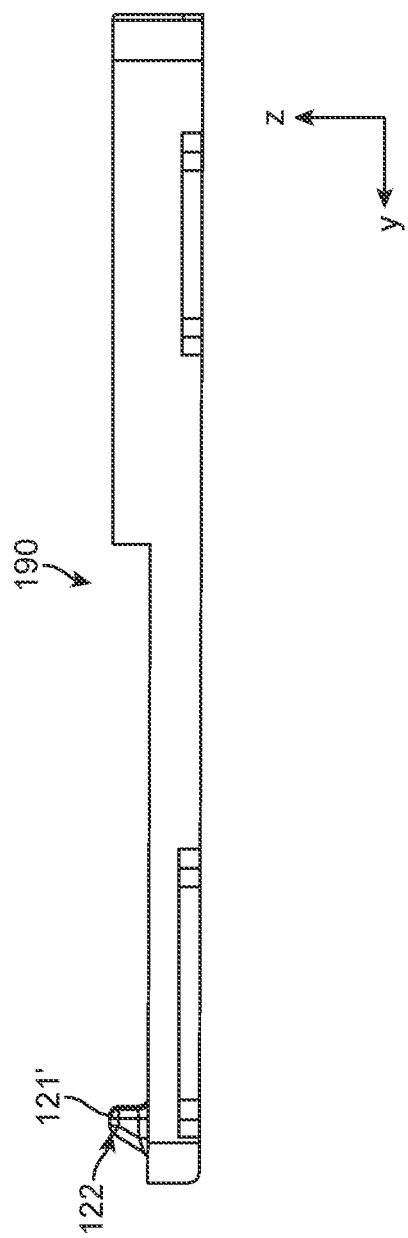
FIG. 15 is a right side view of the carriage plate and beak splitter of FIG. 11.

FIG. 14 is a left side elevation view of the carriage plate 190 and beak splitter 122 of FIG. 11. As seen in this view, the guideposts 121' on the right side of the beak splitter 122 is offset along the Y-direction left side guideposts 121. That offset may facilitate proper opening of a bird's beak in view of the upper opening 127 of delivery tube passageway 123 along the right side of the beak splitter 122.

Figure 16:
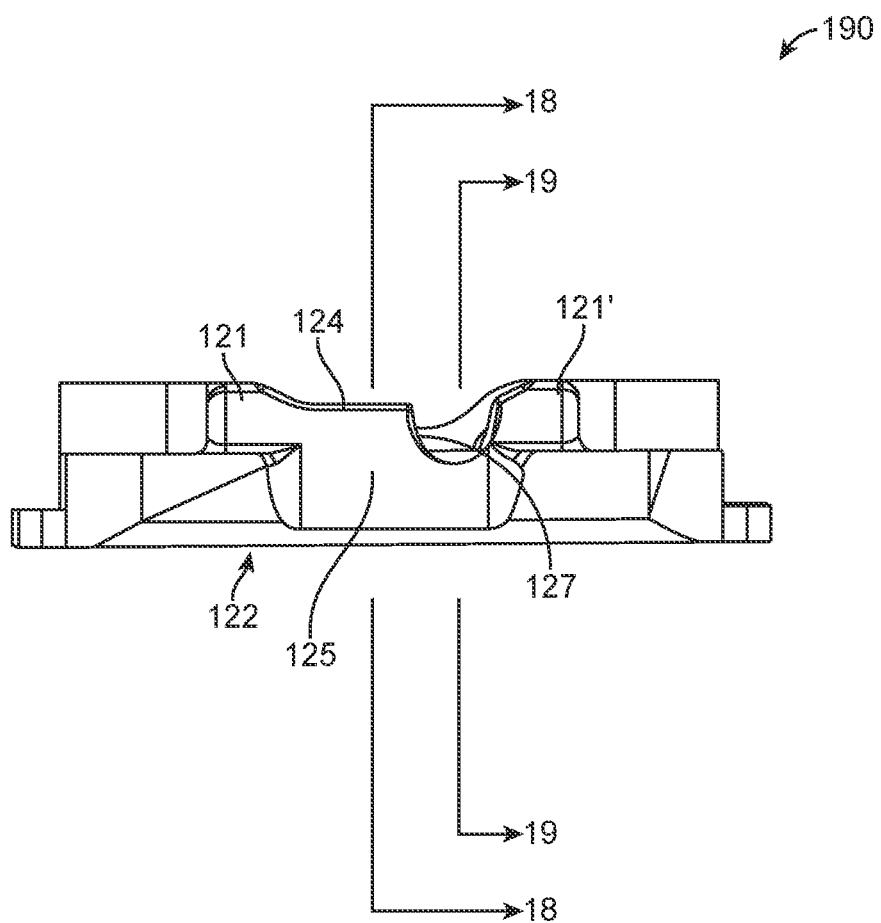
FIG. 16 is a front view of the carriage plate and beak splitter of FIG. 11.

FIG. 16 is a front end view of the carriage plate 190 and beak splitter 122 located thereon of FIG. 11. In this view, the left and right guideposts 121 and 121' of the beak splitter 122 along with top edge 124 and lower beak contact surface 125 are visible. Also seen in FIG. 16 is the upper opening 127 of the delivery tube passageway.

Figure 17:
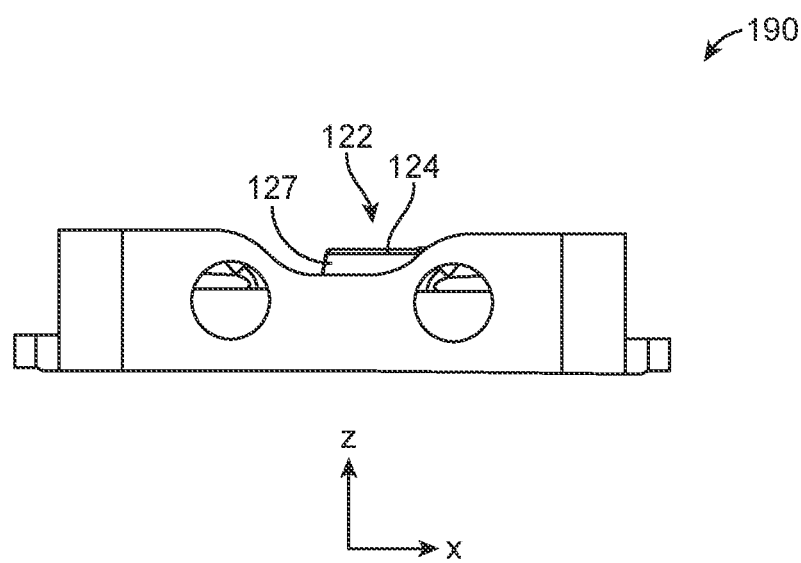
FIG. 17 is a rear view of the carriage plate in beak splitter of FIG. 11.

FIG. 17 is a rear end view of the carriage plate 190 and beak splitter 122 located thereon of FIG. 11. Much of the beak splitter 122 is obscured in this view, although a portion of the top edge 124 of the beak splitter and the upper opening 127 of the delivery tube passageway are visible in this view.

Figure 18:
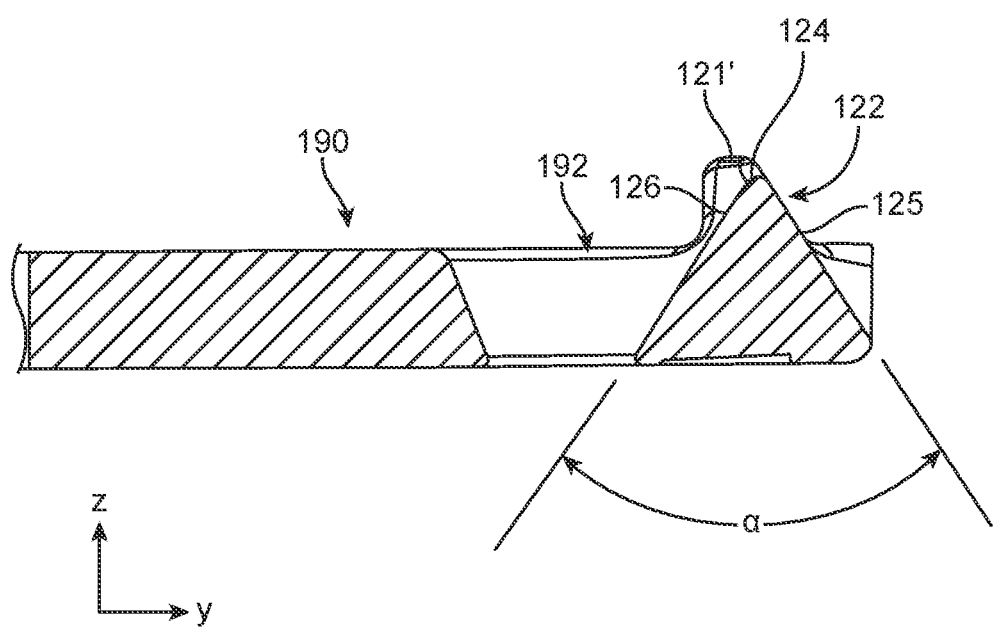
FIG. 18 is an enlarged partial cross-sectional view of the beak splitter of FIG. 11 taken along line 18-18 in FIG. 16.

FIG. 18 is an enlarged partial cross-sectional view of the beak splitter of FIG. 11 taken along line 18-18 in FIG. 16. The beak splitter 122 as seen in FIG. 18 includes upper beak contact surface 126, lower beak contact surface 125 and top edge 124 along which the upper and lower beak contact surfaces meet. Right side guideposts 121' is also visible, along with beak opening 192 in carriage plate 190.

One feature illustrated in the cross-sectional view of FIG. 18 is the angle α (alpha) defined by the upper and lower beak contact surfaces 126 and 125. In the depicted illustrative embodiment of beak splitter 122 in the form of, e.g., a wedge, the angle α (alpha) formed by the upper and lower beak contact surfaces 126 and 125 is approximately 70°. In other alternative embodiments, however, the angle formed between upper and lower beak contact surfaces of a beak splitter as described herein may be smaller or larger than that found in the depicted illustrative embodiment. In one or more embodiments, for example, the angle α (alpha) formed between upper and lower beak contact surfaces of a beak splitter may be 30° or more, 40° or more, 50° or more, 60° or more, 80° or more, or even 90° or more. At the upper end, one or more embodiments of the angle α (alpha) formed between upper and lower beak contact surfaces of a beak splitter as described herein may be 150° or less, 140° or less, 130° or less, 120° or less, 110° or less, 100° or less, 90° or less, 80° or less, 70° or less, or 60° or less.

Furthermore, although the depicted illustrative embodiment of beak spitting wedge 122 includes upper and lower contact surfaces 126 and 125 that are essentially flat surfaces, one or more alternative embodiments of beak splitter is that may be used in connection with the systems and/or apparatus described herein may include curved or otherwise shaped non-flat surfaces for one or both of the upper and lower beak contact surfaces.

Figure 19:
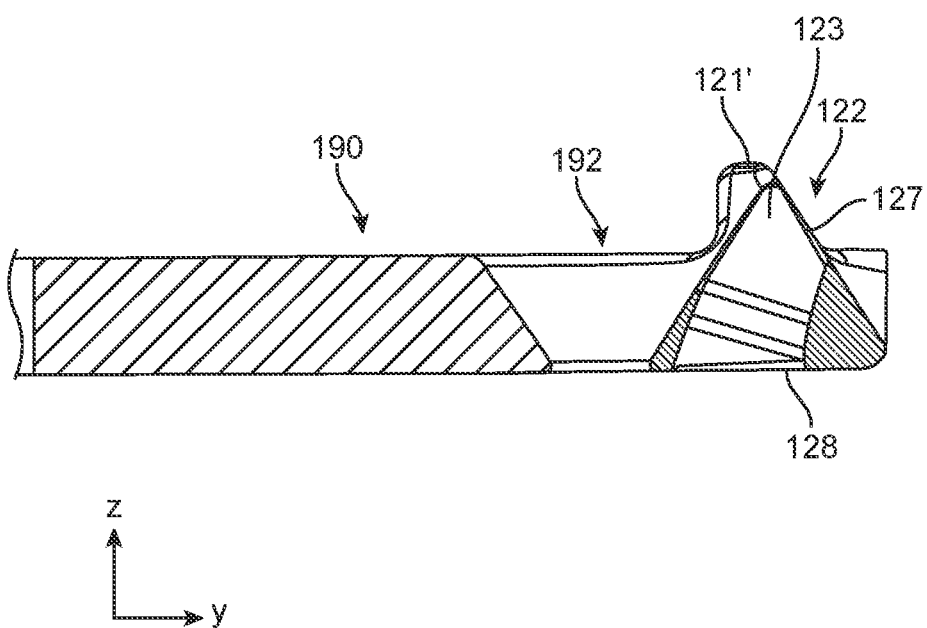
FIG. 19 is an enlarged partial cross-sectional view of the beak splitter of FIG. 11 taken along line 19-19 in FIG. 16.

FIG. 19 is an enlarged partial cross-sectional view of the beak splitter of FIG. 11 taken along line 19-19 in FIG. 16. As seen in the cross-sectional view of FIG. 19, the delivery tube passageway 123 extends between upper opening 127 and lower opening 128. Also depicted in FIG. 19 R right side guideposts 121' of the beak splitter, along with beak opening 192 in carriage plate 190. It should be understood that the delivery tube passageway 123 may take any variety of forms and need not necessarily follow a curved or arcuate path between lower opening 128 and upper opening 127 as in the depicted illustrative embodiment of delivery tube passageway 123.

The inventions described herein may be implemented in one or more of the following embodiments:

Embodiment 1. A beak opening apparatus for opening a beak of a bird positioned in a delivery location relative to the beak opening apparatus, the apparatus comprising:
  a beak splitter movable between a home position and an opening position, wherein the beak splitter is configured to separate an upper mandible of the bird in the delivery location from a lower mandible of the bird to open the beak of the bird in the delivery location when the beak splitter moves from the home position to the opening position;
  a beak opening actuator operably connected to the beak splitter, wherein the beak opening actuator is configured to move the beak splitter between the opening position and the home position; and
  a control unit operably connected to the beak opening actuator, wherein the control unit is configured to operate the beak opening actuator to move the beak splitter between the home position and the opening position.

Embodiment 2. A beak opening apparatus according to embodiment 1, wherein the beak opening apparatus further comprises a sensor apparatus operably connected to the control unit and configured to detect when the beak of the bird positioned in the delivery location is open, wherein the sensor apparatus comprises one or more of: an optical source and an optical sensor, a proximity detector, an ultrasonic detector, and a mechanical switch.

Embodiment 3. A beak opening apparatus according to any one of embodiments 1 to 2, wherein the beak opening apparatus comprises a sensor apparatus operably connected to the control unit and configured to detect when the beak of the bird positioned in the delivery location is open, wherein the sensor apparatus comprises an optical source and a pair of optical sensors;
  wherein a first optical sensor of the pair of optical sensors is positioned such that the lower mandible of the beak of the bird blocks light emitted by the optical source from reaching the first optical sensor when the beak of the bird positioned in the delivery location is open;
  and wherein a second optical sensor of the pair of optical sensors is positioned such that the upper mandible of the beak of the bird blocks light emitted by the optical source from reaching the second optical sensor when the beak of the bird positioned in the delivery location is open.

Embodiment 4. A beak opening apparatus according to any one of embodiments 1 to 3, wherein the beak opening apparatus further comprises a beak tip detector operably connected to the control unit, wherein the control unit is configured to:
  receive a signal from the beak tip detector when the beak tip detector detects the tip of the upper mandible of the beak of the bird in the delivery location; and
  operate the beak opening actuator to move the beak splitter between the home position and the opening position after receiving the signal from the beak tip detector.

Embodiment 5. A beak opening apparatus according to embodiment 4, wherein the beak tip detector comprises one or more of: an optical source and optical detector, a proximity detector, an ultrasonic detector, and a mechanical detector.

Embodiment 6. A beak opening apparatus according to any one of embodiments 1 to 5, wherein the beak splitter is shaped to contact the upper mandible of the beak of the bird in the delivery location before the beak splitter contacts the lower mandible when the beak splitter is moving from the home position to the opening position.

Embodiment 7. A beak opening apparatus according to embodiment 6, wherein the beak splitter comprises a contact surface positioned to contact the upper mandible of the beak of the bird in the delivery location before the beak splitter contacts the lower mandible when the beak splitter is moving from the home position to the opening position.

Embodiment 8. A beak opening apparatus according to any one of embodiments 1 to 7, wherein the beak splitter moves along an arcuate path when moving between the home position and the opening position.

Embodiment 9. A beak opening apparatus according to any one of embodiments 1 to 8, wherein the beak splitter is located on a beak opening carriage and the beak opening actuator is operably connected to the beak opening carriage, wherein the beak opening carriage is movable between a carriage home position and a carriage opening position, wherein the beak splitter is in the home position when the beak opening carriage is in the carriage home position, and wherein the beak splitter is in the opening position when the beak opening carriage is in the carriage opening position.

Embodiment 10. A beak opening apparatus according to any one of embodiments 1 to 9, wherein the beak opening apparatus comprises a carrier configured to restrain a bird in the delivery location.

Embodiment 11. A method of opening a beak of a bird using the beak opening apparatus of any one of embodiments 1 to 10.

Embodiment 12. A method of opening a beak of a bird, the method comprising:
  positioning a bird in a delivery location;
  moving a beak splitter from a home position to an opening position after positioning the bird in the delivery location, wherein moving the beak splitter separates the upper mandible from the lower mandible to open the beak of the bird; and
  moving the bird out of the delivery location after opening the beak of the bird.

Embodiment 13. A method according to embodiment 12, wherein moving the beak splitter from the home position to the opening position comprises contacting the upper mandible of the beak before contacting the lower mandible of the beak.

Embodiment 14. A method according to any one of embodiments 12 to 13, wherein the beak splitter moves along an arcuate path when moving between the home position and the opening position.

Embodiment 15. A method according to any one of embodiments 12 to 14, wherein the method further comprises detecting the tip of the upper mandible of the beak of the bird positioned in the delivery location before moving the beak splitter from the home position to the opening position.

Embodiment 16. A method according to any one of embodiments 12 to 15, wherein the method comprises returning the beak splitter from the opening position to the home position before moving the bird out of the delivery location.

Embodiment 17. A method according to any one of embodiments 12 to 16, wherein the method further comprises restraining the bird in a carrier before positioning the bird in the delivery location, and moving the bird restrained in the carrier into the delivery location.

Embodiment 18. A system for delivering material through an open beak to a digestive tract of a bird positioned in a delivery location relative to the system, the system comprising:
  a delivery tube extending between a delivery end and a supply end;
  a delivery tube driver configured to move the delivery tube between a retracted position and a delivery position, wherein the delivery end of the delivery tube is located in the digestive tract of the bird when the bird is positioned in the delivery location and beak of the bird is open; and
  a material delivery device connected to the supply end of the delivery tube and a supply configured to contain material for delivery to the bird positioned in the delivery location, wherein the material delivery device is configured to deliver the material from the supply into the delivery tube through the supply end of the delivery tube; and
  a control unit operably connected to the delivery tube driver, wherein the control unit is configured to operate the delivery tube driver to move the delivery tube between the retracted position and the delivery position.

Embodiment 19. A system according to embodiment 18, the system comprising a beak opening apparatus configured to open the beak of the bird positioned in the delivery location, the beak opening apparatus comprising:
  a beak splitter movable between a home position and an opening position, wherein the beak splitter is configured to separate an upper mandible of the bird positioned from a lower mandible of the bird to open the beak of the bird positioned in the delivery location when the beak splitter moves from the home position to the opening position;
  a beak opening actuator operably connected to the beak splitter, wherein the beak opening actuator is configured to move the beak splitter between the opening position and the home position;
  wherein the control unit is operably connected to the beak opening actuator and the control unit is configured to operate the beak opening actuator to move the beak splitter between the home position and the opening position.

Embodiment 20. A system according to any one of embodiments 18 to 19, wherein the delivery end of the delivery tube comprises an enlarged tip, wherein the enlarged tip comprises a maximum tip dimension measured transverse to a delivery tube axis that extends from the supply end to the delivery end of the delivery tube, wherein the delivery tube comprises a maximum tube dimension measured transverse to the delivery tube axis at a junction between the delivery tube and the enlarged tip proximal of the enlarged tip, and wherein the maximum tip dimension is larger than the maximum tube dimension.

Embodiment 21. A system according to embodiment 20, wherein the enlarged tip comprises a rounded leading surface.

Embodiment 22. A system according to either one of embodiments 20 or 21, wherein the delivery tube comprises a lumen extending from the supply end to the delivery end, and wherein the lumen extends through the enlarged tip.

Embodiment 23. A system according to any one of embodiments 18 to 22, wherein the delivery end of the delivery tube is offset from a midline of the bird positioned in the delivery location as the delivery tube moves from the retracted position towards the extended position.

Embodiment 24. A system according to any one of embodiments 18 to 23, wherein the delivery tube comprises:
  a delivery end section extending from the delivery end towards the supply end, wherein the delivery end section comprises a length of 15 centimeters or less, 10 centimeters or less, or 5 centimeters or less; and
  a supply end section extending from the supply end towards the delivery end, wherein the supply end section comprises a length of 15 centimeters or less, 10 centimeters or less, or 5 centimeters or less;
  wherein the delivery end section comprises a maximum bending resistance that is lower than a maximum bending resistance of the supply end section.

Embodiment 25. A system according to any one of embodiments 18 to 23, wherein the delivery tube comprises:
  a delivery end section extending from the delivery end towards the supply end; and
  a supply end section extending from the supply end towards the delivery end section;
  wherein a bending resistance of the delivery end section of the delivery tube is less than a bending resistance of the delivery tube within the supply end section.

Embodiment 26. A system according to any one of embodiments 18 to 23, wherein the delivery tube comprises:
  a delivery end section extending from the delivery end towards the supply end; and
  a supply end section extending from the supply end towards the delivery end section;
  wherein the delivery end section comprises a delivery end section length measured from the delivery end to a distal end of the supply end section and wherein the supply end section comprises a supply end section length measured from the supply end to a proximal end of the delivery end section, wherein the delivery end section and the supply end section meet at the distal end of the supply end section and the proximal end of the supply end section, and wherein the delivery end section length is equal to or greater than the supply end section length.

Embodiment 27. A system according to any one of embodiments 1 to 26, wherein the beak splitter is configured to direct the delivery end of the delivery tube into the digestive tract of the bird when the bird is positioned in the delivery location and beak of the bird is open.

Embodiment 28. A system according to embodiment 27, wherein the delivery end of the delivery tube is closer to the beak splitter when the delivery tube is in the retracted position than when the delivery tube is in the delivery position.

Embodiment 29. A system according to any one of embodiments 27 or 28, wherein the beak splitter comprises a delivery tube passageway formed therethrough, wherein the delivery tube moves within the delivery tube passageway when the delivery tube moves between the retracted position and the delivery position.

Embodiment 30. A system according to any one of embodiments 18 to 29, wherein the delivery tube driver is configured to move the delivery tube such that, when the delivery tube is in the delivery position and the bird is positioned in the delivery location, the delivery end of the delivery tube is located in the esophagus of the bird, in the esophagus of the bird just proximal of the crop, and/or in the crop of the bird.

Embodiment 31. A system according to any one of embodiments 19 to 30, wherein the beak opening apparatus further comprises a sensor apparatus operably connected to the control unit and configured to detect when the beak of the bird positioned in the delivery location is open, wherein the sensor apparatus comprises one or more of: an optical source and an optical sensor, a proximity detector, an ultrasonic detector, and a mechanical switch.

Embodiment 32. A system according to any one of embodiments 19 to 30, wherein the beak opening apparatus comprises a sensor apparatus operably connected to the control unit and configured to detect when the beak of the bird positioned in the delivery location is open, wherein the sensor apparatus comprises an optical source and a pair of optical sensors;
wherein a first optical sensor of the pair of optical sensors is positioned such that the lower mandible of the beak of the bird blocks light emitted by the optical source from reaching the first optical sensor when the beak of the bird positioned in the delivery location is open;
and wherein a second optical sensor of the pair of optical sensors is positioned such that the upper mandible of the beak of the bird blocks light emitted by the optical source from reaching the second optical sensor when the beak of the bird positioned in the delivery location is open.

Embodiment 33. A system according to any one of embodiments 19 to 32, wherein the beak opening apparatus further comprises a beak tip detector operably connected to the control unit, wherein the control unit is configured to:
receive a signal from the beak tip detector when the beak tip detector detects the tip of the upper mandible of the beak of the bird positioned in the delivery location; and
operate the beak opening actuator to move the beak splitter between the home position and the opening position after receiving the signal from the beak tip detector.

Embodiment 34. A system according to embodiment 33, wherein the beak tip detector comprises one or more of: an optical source and optical detector, a proximity detector, an ultrasonic detector, and a mechanical detector.

Embodiment 35. A system according to any one of embodiments 19 to 34, wherein the beak splitter is shaped to contact the upper mandible of the beak of the bird positioned in the delivery location before the beak splitter contacts the lower mandible when the beak splitter is moving from the home position to the opening position.

Embodiment 36. A system according to embodiment 35, wherein the beak splitter comprises a contact surface positioned to contact the upper mandible of the beak of the bird positioned in the delivery location before the beak splitter contacts the lower mandible when the beak splitter is moving from the home position to the opening position.

Embodiment 37. A system according to any one of embodiments 19 to 36, wherein the beak splitter moves along an arcuate path when moving between the home position and the opening position.

Embodiment 38. A system according to any one of embodiments 19 to 37, wherein the beak splitter is located on a beak opening carriage and the beak opening actuator is operably connected to the beak opening carriage, wherein the beak opening carriage is movable between a carriage home position and a carriage opening position, wherein the beak splitter is in the home position when the beak opening carriage is in the carriage home position, and wherein the beak splitter is in the opening position when the beak opening carriage is in the carriage opening position.

Embodiment 39. A system according to any one of embodiments 18 to 38, wherein the system comprises a carrier configured to restrain a bird in the delivery location.

Embodiment 40. A method of delivering material to a digestive tract of a bird through an open beak of the bird using the system of any one of embodiments 18 to 39.

Embodiment 41. A method of delivering material to a digestive tract of a bird through an open beak of the bird, the method comprising:
positioning a bird in a delivery location;
opening the beak of the bird after positioning the bird in the delivery location by separating the upper mandible from the lower mandible;
extending a delivery end of a delivery tube into the digestive tract of the bird through the open beak of the bird;
passing material through the delivery tube and into the digestive tract of the bird while the delivery end of the delivery tube is in the digestive tract of the bird;
removing the delivery tube from the digestive tract of the bird after passing material through the delivery tube into the digestive tract; and
moving the bird out of the delivery location.

Embodiment 42. A method according to embodiment 41, wherein opening the beak of the bird comprises contacting the upper mandible of the beak before contacting the lower mandible of the beak.

Embodiment 43. A method according to any one of embodiments 41 to 42, wherein opening the beak of the bird comprises moving a beak splitter from a home position to an opening position between the upper mandible and the lower mandible of the beak.

Embodiment 44. A method according to embodiment 41, wherein opening the beak of the bird comprises moving a beak splitter from a home position to an opening position between the upper mandible and the lower mandible of the beak, and wherein the beak splitter contacts the upper mandible of the beak of the bird positioned in the delivery location before the beak splitter contacts the lower mandible when the beak splitter is moving from the home position to the opening position.

Embodiment 45. A method according to any one of embodiments 43 to 44, wherein the beak splitter moves along an arcuate path when moving between the home position and the opening position.

Embodiment 46. A method according to any one of embodiments 41 to 45, wherein the method further comprises detecting the tip of the upper mandible of the beak of the bird positioned in the delivery location before opening the beak of the bird.

Embodiment 47. A method according to any one of embodiments 43 to 46, wherein the beak splitter directs the delivery end of the delivery tube into the digestive tract of the bird when the bird is positioned in the delivery location and beak of the bird is open.

Embodiment 48. A method according to embodiment 47, wherein extending the delivery end of the delivery tube into the digestive tract of the bird comprises moving the delivery tube from a retracted position to a delivery position, and wherein the delivery end of the delivery tube is closer to the beak splitter when the delivery tube is in the retracted position than when the delivery tube is in the delivery position.

Embodiment 49. A method according to embodiment 48, wherein the delivery end of the delivery tube is offset from a midline of the bird positioned in the delivery location as the delivery tube moves from the retracted position towards the extended position.

Embodiment 50. A method according to any one of embodiments 48 or 49, wherein the beak splitter comprises a delivery tube passageway formed therethrough, wherein the delivery tube moves within the delivery tube passageway when the delivery tube moves between the retracted position and the delivery position.

Embodiment 51. A method according to any one of embodiments 41 to 50, wherein extending the delivery end of the delivery tube into the digestive tract of the bird comprises positioning the delivery end of the delivery tube in is located in the esophagus of the bird, in the esophagus of the bird just proximal of the crop, and/or in the crop of the bird.

Embodiment 52. A method according to any one of embodiments 41 to 51, wherein the delivery tube comprises:
 a delivery end section extending from the delivery end towards the supply end, wherein the delivery end section comprises a length of 15 centimeters or less, 10 centimeters or less, or 5 centimeters or less; and
 a supply end section extending from the supply end towards the delivery end, wherein the supply end section comprises a length of 15 centimeters or less, 10 centimeters or less, or 5 centimeters or less;
 wherein the delivery end section comprises a maximum bending resistance that is lower than a maximum bending resistance of the supply end section.

Embodiment 53. A method according to any one of embodiments 41 to 51, wherein the delivery tube comprises:
 a delivery end section extending from the delivery end towards the supply end; and
 a supply end section extending from the supply end towards the delivery end section;
 wherein a bending resistance of the delivery end section of the delivery tube is less than a bending resistance of the delivery tube within the supply end section.

Embodiment 54. A method according to any one of embodiments 41 to 51, wherein the delivery tube comprises:
 a delivery end section extending from the delivery end towards the supply end; and
 a supply end section extending from the supply end towards the delivery end section;
 wherein the delivery end section comprises a delivery end section length measured from the delivery end to a distal end of the supply end section and wherein the supply end section comprises a supply end section length measured from the supply end to a proximal end of the delivery end section, wherein the delivery end section and the supply end section meet at the distal end of the supply end section and the proximal end of the supply end section, and wherein the delivery end section length is equal to or greater than the supply end section length.

Embodiment 55. A method according to any one of embodiments 41 to 54, wherein the method further comprises restraining the bird in a carrier before positioning the bird in the delivery location, and moving the bird restrained in the carrier into the delivery location.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the systems and methods of using the same are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A beak opening apparatus comprising: a beak splitter comprising an upper beak contact surface and a lower beak contact surface forming a wedge configured for insertion between an upper mandible and a lower mandible of a beak of a bird, the beak splitter movable between a home position and an opening position, wherein the upper beak contact surface is in contact with the upper mandible of the bird when the beak splitter is in the opening position and spaced apart from the upper mandible of the bird when the beak splitter is in the home position, the beak splitter configured to separate the upper mandible of the bird from the lower mandible of the bird to open the beak of the bird when the beak splitter moves from the home position to the opening position; a beak opening actuator operably connected to the beak splitter, wherein the beak opening actuator is configured to move the beak splitter between the opening position and the home position, wherein the beak splitter is configured to contact the upper mandible of the beak of the bird before the beak splitter contacts the lower mandible when the beak splitter is moving from the home position to the opening position to separate the upper mandible from the lower mandible to open the beak of the bird; and a control unit operably connected to the beak opening actuator, wherein the control unit is configured to operate the beak opening actuator to move the beak splitter between the home position and the opening position.

2. An apparatus according to claim 1, the apparatus comprising a passageway formed through the beak splitter.

3. An apparatus according to claim 2, wherein the upper beak contact surface and the lower beak contact surface meet along a top edge of the beak splitter, and wherein the passageway extends from a top opening located along the top edge to a bottom opening proximate a base of the beak splitter.

4. An apparatus according to claim 2, wherein the apparatus comprises:
 a delivery tube extending between a delivery end and a supply end;
 a delivery tube driver configured to move the delivery tube between a retracted position and a delivery position, wherein the delivery tube moves within the passageway in the beak splitter when moving between the retracted position and the delivery position when the beak of the bird is open; and and wherein the control unit operably is connected to the delivery tube driver and configured to operate the delivery tube driver to move the delivery tube in the passageway.

5. An apparatus according to claim 4, wherein the apparatus comprises:
a supply of material to be delivered to the bird through the delivery tube;
a material delivery device operably connected to the supply and the supply end of the delivery tube;
wherein the material delivery device is operably connected to the control unit and the control unit is configured to operate the material delivery device to deliver the material from the supply to the bird through the delivery tube after operating the beak opening actuator to move the beak splitter from the home position to the opening position.

6. An apparatus according to claim 1, wherein the upper beak contact surface and the lower beak contact surface meet along a top edge of the beak splitter, and wherein the beak splitter comprises a passageway formed through the beak splitter, the passageway extending from a top opening located along the top edge to a bottom opening proximate a base of the beak splitter.

7. An apparatus according to claim 1, wherein the beak opening apparatus further comprises a sensor apparatus operably connected to the control unit and configured to detect when the beak of the bird is opened by the beak splitter, wherein the sensor apparatus comprises one or more of: an optical source and an optical sensor, a proximity detector, an ultrasonic detector, and a mechanical switch.

8. An apparatus according to claim 1, wherein the beak opening apparatus comprises a sensor apparatus operably connected to the control unit and configured to detect when a beak of a bird is open, wherein the sensor apparatus comprises an optical source and a pair of optical sensors;
wherein a first optical sensor of the pair of optical sensors is positioned such that the lower mandible of the beak of the bird blocks light emitted by the optical source from reaching the first optical sensor when the beak of the bird positioned in the delivery location is open;
and wherein a second optical sensor of the pair of optical sensors is positioned such that the upper mandible of the beak of the bird blocks light emitted by the optical source from reaching the second optical sensor when the beak of the bird positioned in the delivery location is open.

9. An apparatus according to claim 1, wherein the beak opening apparatus further comprises a beak tip detector operably connected to the control unit, wherein the control unit is configured to:
receive a signal from the beak tip detector when the beak tip detector detects the tip of the upper mandible of the beak of the bird in the delivery location; and
operate the beak opening actuator to move the beak splitter between the home position and the opening position after receiving the signal from the beak tip detector.

10. An apparatus according to claim 1, wherein the upper beak contact surface is configured to contact the upper mandible of the beak of the bird in the delivery location before the lower beak contact surface of the beak splitter contacts the lower mandible when the beak splitter is moving from the home position to the opening position.

11. An apparatus according to claim 1, wherein the beak splitter moves along an arcuate path when moving between the home position and the opening position.

12. An apparatus according to claim 1, wherein the beak splitter is located on a beak opening carriage and the beak opening actuator is operably connected to the beak opening carriage, wherein the beak opening carriage is movable between a carriage home position and a carriage opening position, wherein the beak splitter is in the home position when the beak opening carriage is in the carriage home position, and wherein the beak splitter is in the opening position when the beak opening carriage is in the carriage opening position.

13. An apparatus comprising: a beak splitter comprising an upper beak contact surface and a lower beak contact surface forming a wedge configured for insertion between an upper mandible and a lower mandible of a beak of a bird, the beak splitter movable between a home position and an opening position, wherein the upper beak contact surface is in contact with the upper mandible of the bird when the beak splitter is in the opening position and spaced apart from the upper mandible of the bird when the beak splitter is in the home position, the beak splitter configured to separate the upper mandible of the bird from the lower mandible of the bird to open the beak of the bird when the beak splitter moves from the home position to the opening position; a passageway formed through the beak splitter; a beak opening actuator operably connected to the beak splitter, wherein the beak opening actuator is configured to move the beak splitter between the opening position and the home position, wherein the beak splitter is configured to contact the upper mandible of the beak of the bird before the beak splitter contacts the lower mandible when the beak splitter is moving from the home position to the opening position to separate the upper mandible from the lower mandible to open the beak of the bird; a delivery tube extending between a delivery end and a supply end; a delivery tube driver configured to move the delivery tube between a retracted position and a delivery position, wherein the delivery tube moves within the passageway in the beak splitter when moving between the retracted position and the delivery position when the beak of the bird is open; and a control unit operably connected to the beak opening actuator and the delivery tube driver, the control unit configured to: operate the beak opening actuator to move the beak splitter between the home position and the opening position, and operate the delivery tube driver to move the delivery tube in the passageway.

14. An apparatus according to claim 13, wherein the upper beak contact surface and the lower beak contact surface meet along a top edge of the beak splitter, and wherein the passageway extends from a top opening located along the top edge to a bottom opening proximate a base of the beak splitter.

15. An apparatus according to claim 13, wherein the beak opening apparatus further comprises a sensor apparatus operably connected to the control unit and configured to detect when the beak of the bird is opened by the beak splitter.

16. An apparatus according to claim 13, wherein the beak opening apparatus further comprises a beak tip detector operably connected to the control unit, wherein the control unit is configured to:
receive a signal from the beak tip detector when the beak tip detector detects the tip of the upper mandible of a beak of a bird; and
operate the beak opening actuator to move the beak splitter between the home position and the opening position after receiving the signal from the beak tip detector.

17. An apparatus according to claim 13, wherein the upper beak contact surface is configured to contact the upper mandible of the beak of a bird before the lower beak contact surface of the beak splitter contacts the lower mandible when the beak splitter is moving from the home position to the opening position.

18. A method of opening a beak of a bird, comprising:
positioning a bird in a delivery location;
moving a beak splitter into contact with a beak of a bird using a beak opening actuator operably connected to the beak splitter and controlled by a control unit, the beak splitter comprising an upper beak contact surface and a lower beak contact surface forming a wedge; wherein moving the beak splitter into contact with the beak of the bird comprises contacting an upper mandible of the beak of the bird before contacting a lower mandible of the beak of the bird with the lower beak contact surface;
wherein moving the beak splitter into contact with the beak of the bird separates the upper mandible from the lower mandible to open the beak of the bird; and
moving the bird out of the delivery location after opening the beak of the bird.

19. A method according to claim 18, wherein the beak splitter moves along an arcuate path when moving into contact with the beak of the bird.

20. A method according to claim 18, wherein the method further comprises detecting the tip of the upper mandible of the beak of the bird before moving the beak splitter into contact with the beak of the bird.

21. A method according to claim 18, wherein the beak splitter comprises a passageway formed therethrough, and wherein the method comprises delivering selected material into the bird through the passageway after separating the upper mandible from the lower mandible to open the beak of the bird.

22. A method according to claim 21, wherein delivering selected material into the bird comprises delivering the selected material into the mouth/oral cavity of the bird.

23. A method according to claim 21, wherein delivering selected material into the bird comprises advancing a delivery tube through the passageway before delivering the selected material into the bird.

24. A method according to claim 23, wherein delivering selected material into the bird comprises delivering the selected material into the mouth/oral cavity of the bird.

25. A method according to claim 21, wherein the passageway extends between a top opening located along an apex of the wedge and extends through the wedge to a bottom opening proximate a base of the wedge.

26. A method according to claim 18, wherein the upper beak contact surface and the lower beak contact surface meet along a top edge of the beak splitter, and wherein the beak splitter comprises a passageway formed through the beak splitter, the passageway extending from a top opening located along the top edge to a bottom opening proximate a base of the beak splitter, and wherein the method comprises delivering selected material into the bird through the passageway after separating the upper mandible from the lower mandible to open the beak of the bird.

27. A method according to claim 26, wherein delivering selected material into the bird comprises delivering the selected material into the mouth/oral cavity of the bird.

28. A method according to claim 26, wherein delivering selected material into the bird comprises advancing a delivery tube through the passageway before delivering the selected material into the bird.

29. A method according to claim 28, wherein delivering selected material into the bird comprises delivering the selected material into the mouth/oral cavity of the bird.

* * * * *